(12) United States Patent
Satoh et al.

(10) Patent No.: US 6,246,643 B1
(45) Date of Patent: Jun. 12, 2001

(54) DISK CHANGER DEVICE

(75) Inventors: Nobuhiro Satoh; Hideki Hayashi; Kazuki Takai, all of Tokyo (JP)

(73) Assignee: Clarion Co., Ltd., Saitama-ken (JP)

( * ) Notice: Subject to any disclaimer, the term of this patent is extended or adjusted under 35 U.S.C. 154(b) by 0 days.

(21) Appl. No.: 08/967,835

(22) Filed: Nov. 12, 1997

(30) Foreign Application Priority Data

Nov. 13, 1996 (JP) .................................................. 8-302237
Jan. 31, 1997 (JP) .................................................. 9-019455

(51) Int. Cl.[7] .................................................. G11B 17/22
(52) U.S. Cl. .................................................. 369/38
(58) Field of Search .................................................. 369/34, 35, 36, 369/38, 77.1, 178

(56) References Cited

U.S. PATENT DOCUMENTS

| | | | |
|---|---|---|---|
| 5,128,918 | * 7/1992 | Suzuki et al. | 369/75.2 |
| 5,528,442 | * 6/1996 | Hisatomi | 369/75.2 |
| 5,812,510 | * 9/1998 | Son | 369/75.2 |

FOREIGN PATENT DOCUMENTS

| | | |
|---|---|---|
| 3601831 | 1/1986 | (DE) . |
| 4408120 | 3/1994 | (DE) . |
| 0506458 | 9/1992 | (EP) . |
| 6290528 | 10/1994 | (JP) . |

* cited by examiner

Primary Examiner—David Davis
(74) Attorney, Agent, or Firm—Hogan & Hartson L.L.P.

(57) ABSTRACT

A disk changer device is provided which is capable of maintaining continuity of control, small, and simple, by means of perpetually maintaining a 1-to-1 correspondence relation between the direction of rotation of the driving source and the direction of operation of the disk holding member. A loading unit 40 comprises a transporting plate 43 for transporting disk holding members 11, a chucking plate 44 for driving a drive plate 72 and clamp arm 73, a driving block 45, and so forth. The driving block 45 is provided with a loading pinion 50 which rotates according to the output of a loading motor 47. While the transporting plate 43 makes one reciprocal movement to perform extracting returning operation of the disk holding member 11 by certain rotation control of the loading pinion 50, via the rack 43a, the loading gear 54 is rotated 180° and the chucking plate 44 is driven on the going path or the returning path to perform chucking operation or chucking disengagement operation.

22 Claims, 27 Drawing Sheets

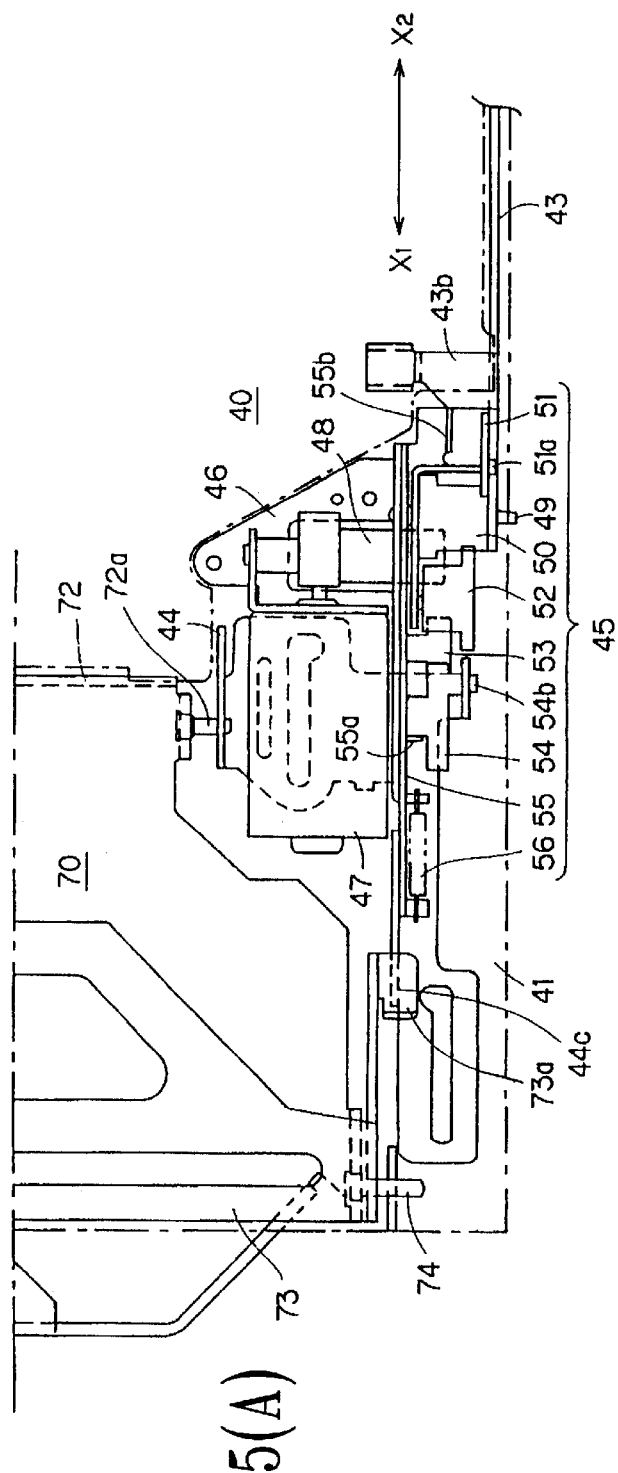
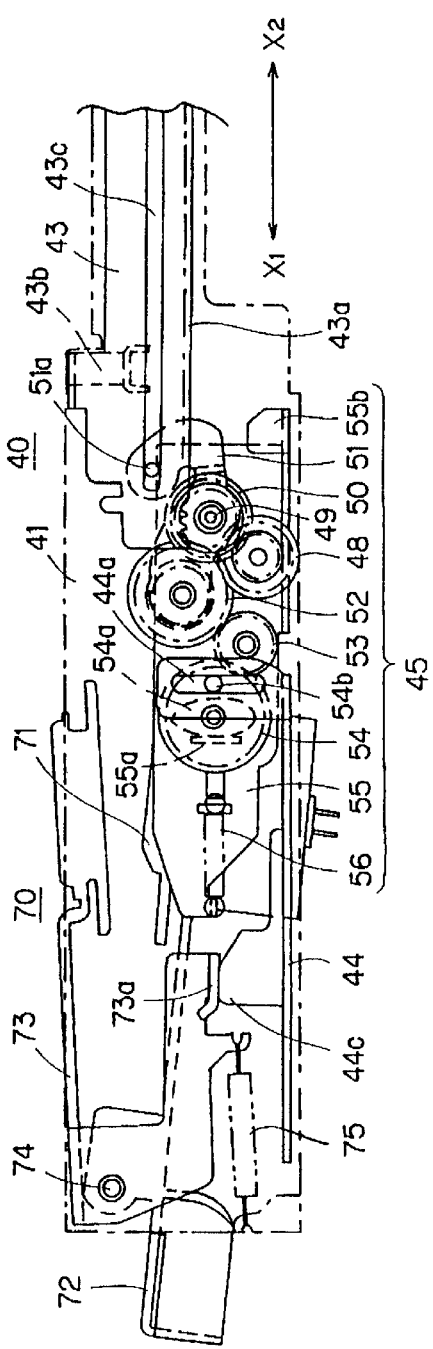
FIG. 5(A)
FIG. 5(B)

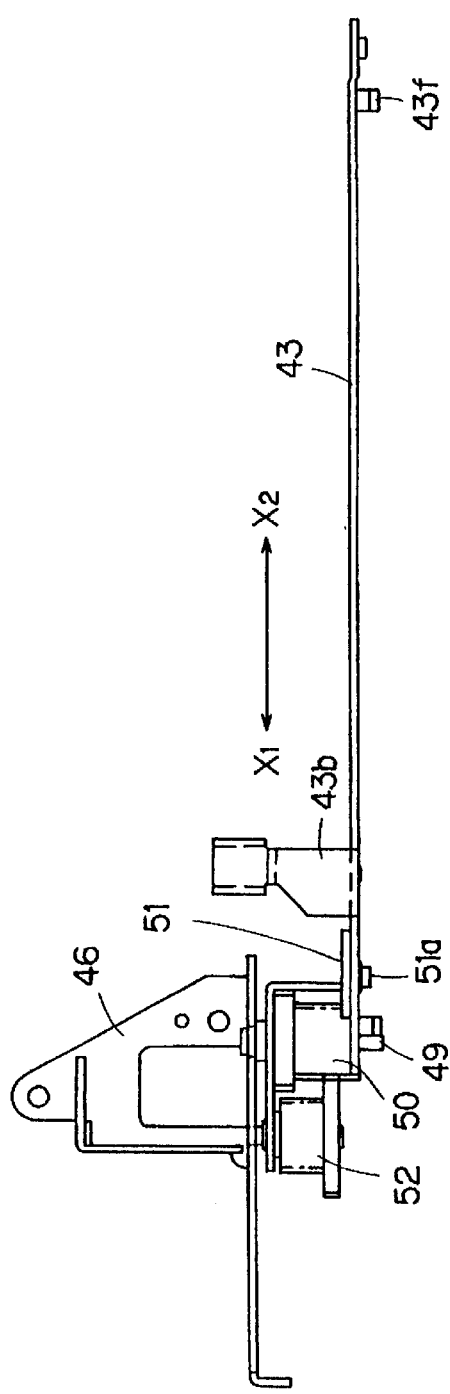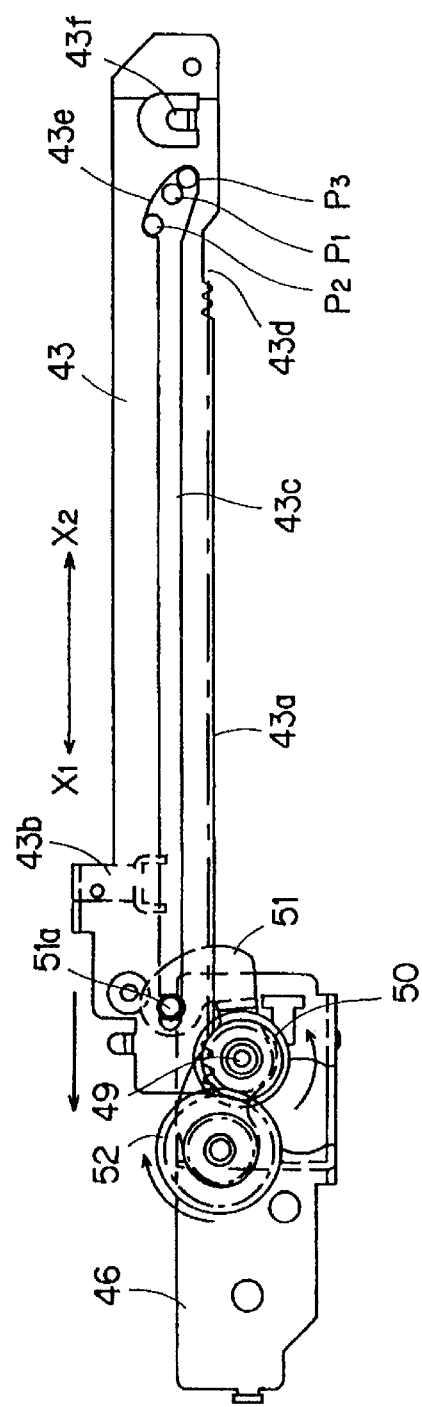
FIG. 8(A)
FIG. 8(B)

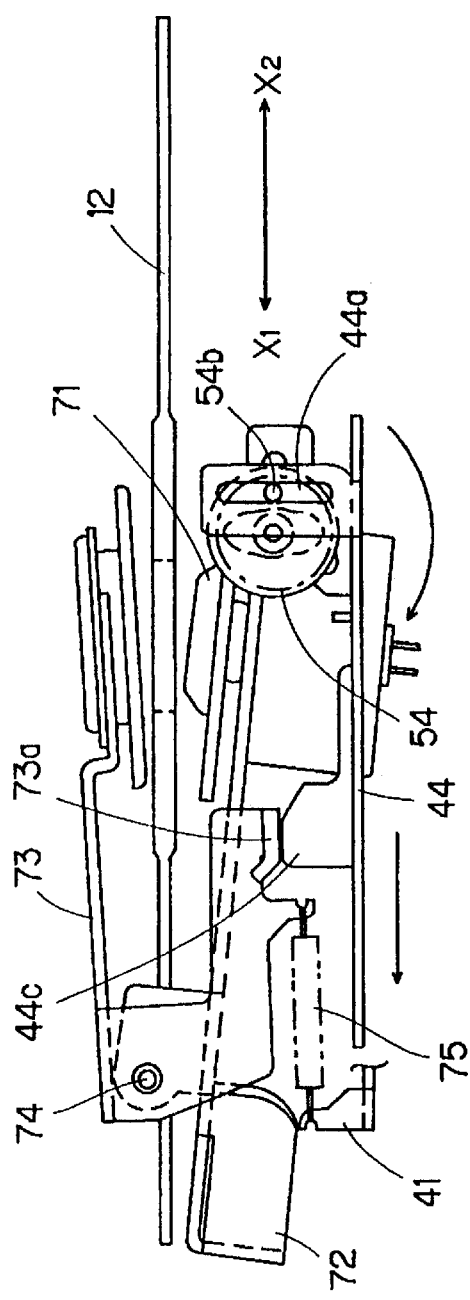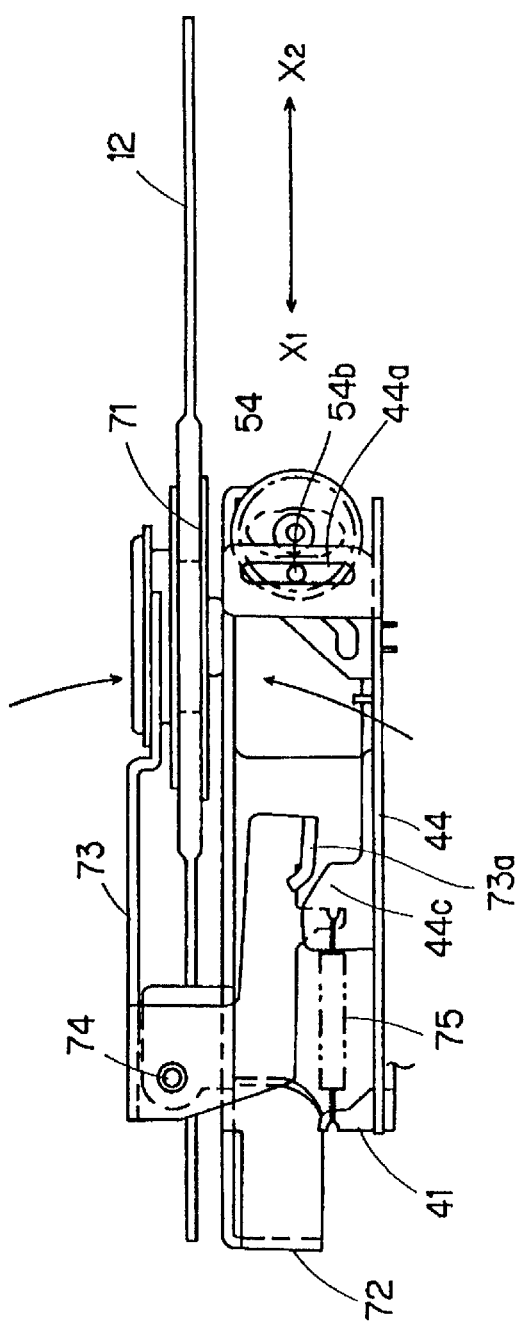
FIG. 13(A)
FIG. 13(B)

DISK CHANGER DEVICE

BACKGROUND OF THE INVENTION

1. Field of the Invention

The present invention relates to a disk changer device which is mounted with a magazine storing a plurality of disk holding members which hold disks and which extracts disks from this magazine and performs recording/replay of these disks, and particularly relates to a loading mechanism for performing the operation of extracting disk holding members from the magazine, the operation of chucking the disks, and the operation of returning the empty disk holding members to the magazine.

2. History of the Prior Art

In recent years, there are many disk devices such as CD players wherein a magazine capable of storing a plurality of disks is provided thereto and automatic selection of one of the plurality of disks stored within the magazine is selected according to selection made by the user so that recording/replay thereof can be made, in order to reduce disk exchanging operations by the user as much as possible, thereby increasing ease of use. With such disk devices, a disk changer device is provided for selectively extracting the desired disk from the magazine mounted to the magazine mounting portion and transporting this disk to the recording/replay means, and returning the disk to the magazine again following recording/replay thereof, in order to perform sequential recording/replay of a plurality of disks by means of common recording/replay means which conducts recording/replay of the disks.

The configuration of such a disk changer device differs according to the configuration of the magazine to be used. For example, a disk changer device is disclosed in Japanese Unexamined Patent Publication 6-290528 employing a magazine provided with disk holding members which can easily hold disks simply by inserting the disks in the plate surface direction thereof. FIG. 28 is a drawing illustrating this device disclosed in the Publication.

This disk changer device illustrated in FIG. 28 is provided with a recording/replay unit 2 capable of moving vertically as to a chassis 1, and a transporting/chucking mechanism 3. The magazine 4 is constructed such that a plurality of disk holding members 5 such as shown in FIG. 29 are arrayed so as to be extractable therefrom and replaceable thereto.

In this case, as shown in FIG. 29, the disk holding member 5 is formed in a cylindrical shape which can store only one disk 6, and is provided with disk insertion opening 5a situated on the side of the opening 4a of the magazine 4, and with a spring 5b provided internally. At the point that the disk 6 is inserted to the predetermined position from the insertion opening 5a, the disk 6 is held by the spring 5b. This disk holding member 5 is also configured so as to be extracted to the position above a turntable 2a of the recording/replay unit 2 by means of a transporting member 3a of the transporting/chucking mechanism 3, as shown in FIG. 28.

Further, regarding the device shown in FIG. 28 and FIG. 29, a cam gear 7 provided with two gullet portions 7a, two cam grooves 7b and 7c, and an arm linkage 7d is used as a single driving source, as shown in FIG. 30, and the arrangement is such that the transporting/chucking mechanism 3 is driven by means of the rotation of this cam gear 7. In this case, as shown in FIG. 30, the arm linkage 7d on the periphery of the cam gear 7 is linked to one end of the arm 3b of the transporting chucking mechanism 3, with the other end of this arm 3b being linked to the transporting member 3a via a gear mechanism 3f comprised of a large and small gear 3c, fixed rack 3e, and a rack 3e provided to the transporting member 3a, and so forth. The arrangement of the gear mechanism 3f is such that the motion stroke of the arm linkage 7d in the transportation direction is doubled and transferred to the transporting member 3a. Also, the two cam grooves 7b and 7c of the cam gear 7 are arranged so as to drive an unshown chucking unit.

Regarding the device having a construction such as shown in FIG. 28 through FIG. 30, in the event that one of the disks 6 within the magazine 4 is to be played, the recording/replay unit 2 and transporting/chucking mechanism 3 are vertically moved, and positioned at a position corresponding with one of the disk holding members 5 of the magazine 4, and then the following disk loading operation is performed by means of the cam gear 7 turning on the first direction by 360°. That is to say, in the disk loading operation, first, the transporting member 3a is driven by means of the cam gear 7 rotating in the first direction by 180° so as to extract the disk holding member 5 holding the disk 6 from the magazine 4. Next, the chucking unit is driven by the gullet portion 7a of the cam gear 7 so as to perform chucking of the disk 6 on the turntable 2a. Following this, the transporting member 3a is driven by means of the cam gear 7 rotating in the first direction by 180° so as to cause the disk holding member 5 to move in the direction opposite to the extracting direction (i.e., the returning direction), thereby returning the disk holding member 5 to within the magazine 4. Consequently, the disk 6 chucked onto the turntable 2a is extracted from the disk holding member 5 during this moving of the disk holding member 5 and left on the turntable 2a, so the disk holding member 5 alone is returned into the magazine 4.

Also, in order to return the disk 6 which has been chucked onto the recording/replay unit 2 to the magazine, the following disk ejecting operation is performed. In this disk ejecting operation, the transporting member 3a is driven by means of the cam gear 7 rotating in the second direction by 180° so as to extract the empty disk holding member 5 from the magazine 4, thus inserting the disk 6 which has been chucked on the turntable 2a into the holding member 5 in accordance with the movement of the holding member 5, thereby the disk 6 being held within the holding member 5. Next, the chucking unit is driven by the gullet portion 7a of the cam gear 7 so as to disengage chucking of the disk 6. Following this, the transporting member 3a is driven by means of the cam gear 7 rotating in the second direction by 180° so as to return the disk holding member 5 to the magazine 4. In this case, the disk 6 is not extracted from the holding member 5, so the disk holding member 5 is returned into the magazine 4 with the disk 6 therein.

As described above, with the device described with reference to FIG. 28 through FIG. 30, the recording/replay unit 2 and transporting/chucking mechanism 3 are vertically moved, and positioned at positions corresponding with each of the disk holding members 5 of the magazine 4, thereby allowing the disks 6 to be extracted from the magazine 4 in a horizontal manner and chucked onto the turntable 2a of the recording/replay unit 2 in that same state. Consequently, the complicated disk transportation operation of extracting the disk from the disk holding member and lowering the disk to the turntable becomes unnecessary, and there is no need to form a gap between this disk holding member and the disk for returning the disk holding member to the magazine. Thus, this arrangement is advantageous in that the amount of space necessary for transporting disks can be reduced, and the number of parts can be reduced.

However, there are problems with the conventional disk changer shown in FIG. 28 through FIG. 30, such as (1) increased dimensions owing to usage of a cam gear, and (2) non-continuity of control owing to non-correspondence of the direction of rotation of the driving source and the transporting direction. These problems will be described below.

(1) Increased Dimensions Owing to Usage of a Cam Gear

For example, in the event that the conventional device shown in FIG. 28 through FIG. 30 is applied to a CD changer device, the diameter of the disk is approximately 120 mm and the diameter of the chucking area at the center of the disk is approximately 40 mm, so even in the event that playing is performed in a state wherein the disk extracted from the magazine and chucked is partially overlapping the disks stored in the magazine, the disk must be extracted from the magazine by at least approximately 80 mm.

In this case, regarding the conventional device shown in FIG. 28 through FIG. 30, as described above, following the cam gear 7 making a half-rotation to extract the disk holding member 5 and chucking the disk 6, the cam gear 7 is arranged such as to return the disk holding member 5 into the magazine 4 with the remaining half-rotation. Accordingly, the transporting member 3a needs to be moved 80 mm or more with the half rotation of the cam gear 7. Conversely, as described above, the motion stroke in the transporting direction of the arm linkage 7d at the periphery of the cam gear 7 is doubled by the gear mechanism 3f and transferred to the transporting member 3a, but even in this case, the cam gear 7 needs to have a diameter of at least 40 mm or more. Accordingly, a large diameter cam gear 7 needs to be provided in the vertical direction, thus increasing the height-wise dimensions.

(2) Non-continuity of Control Owing to Non-correspondence of the Direction of Rotation of the Driving Source and the Transporting Direction Regarding the conventional device shown in FIG. 28 through FIG. 30, there is no corresponding relation between the direction of rotation of the cam gear 7 which serves as the driving source and the transporting direction of the disk holding member 5 by means of the transporting member 3a. For example, regarding the disk loading operation, the disk holding member 5 is moved in the extracting direction with the first half rotation of the cam gear 7 in the first direction, and the disk holding member 5 is moved in the opposite (returning) direction with the second half rotation, so that the disk holding member 5 is moved in two directions whereas the cam gear 7 rotates in one direction. Accordingly, the transporting direction of the disk holding member cannot be immediately determined from the direction of rotation of the cam gear 7 alone, so data regarding both the direction of rotation of the cam gear 7 and the amount of rotation from the predetermined position is required for making determination. Consequently, in the event that the user desires to change the operation which is presently being performed, there is the possibility that appropriate and speed control may not be able to be conducted. Specifically, in the event that the power goes off or so forth during an operation, the data regarding the contents of operations performed so far is lost, and in such a case, the operation being performed before power outage cannot be resumed due to the necessity of returning the mechanism to the initial state and then initiating operations, etc., and continuity of control cannot be maintained.

The present invention has been made in order to solve the above-described problems of the conventional art, and it is an object thereof to provide a disk changer device which is capable of maintaining continuity of control, small, and simple, by means of perpetually maintaining a 1-to-1 correspondence relation between the direction of rotation of the driving source and the direction of operation of the disk holding member.

BRIEF DESCRIPTION OF THE INVENTION

In order to solve the above problems, the present invention extracts the disk from the magazine and performs chucking to the recording/replay means, and also improves the construction of the driving means for driving the disk holding member transporting means and chucking means in the loading mechanism for returning the chucked disk to the magazine, thereby providing a 1-to-1 correspondence relation between the direction of rotation of the driving source and the direction of operation of the disk holding member.

In other words, the present invention first comprises recording/replay means for performing either or both of recording to and playing from a disk. The present invention also comprises chucking means for chucking a disk to the aforementioned recording/replay means, and disk holding member transporting means for extracting disk holding members from a magazine in which a plurality of the aforementioned disk holding members each for holding disks by means of insertion of the aforementioned disks in the plate surface direction thereof are stored in an array so as to be extractable from and replaceable to the magazine, and transporting the aforementioned disk holding members to a certain transporting position within the device. Further, the present invention comprises moving means for supporting the aforementioned recording/replay means, chucking means, and disk holding member transporting means, and allowing these to be movable in the direction of array of the disk holding members within the aforementioned magazine in order to do away with vertical transportation of the disk.

Additionally, the present invention comprises driving means for driving the aforementioned disk holding member transporting means and chucking means so as to extract the aforementioned disk holding member transporting means holding a disk from the aforementioned magazine, chucking the disk held by the aforementioned disk holding member to the aforementioned recording/replay means, and subsequently returning the aforementioned disk holding member alone to the aforementioned magazine. The driving means comprises a single driving source and a selecting mechanism for separately and selectively transferring the output of the driving source to the aforementioned disk holding member transporting means and chucking means.

According to the invention, the following effects can be obtained.

First, when performing replay of a disk within the magazine, the recording/replay means, chucking means, and disk holding member transporting means are moved all at once, positioned with the disk holding member holding the disk within the magazine which is to be played, and then the output of the driving source is selectively transmitted to the disk holding member transporting means and chucking means via the selecting mechanism, whereby the following disk loading operation is performed. i.e., in the disk loading operation, the output of the driving source is transferred via the selecting mechanism to the disk holding member transporting means, chucking means, and disk holding member transporting means in that order, thereby extracting the disk holding member from the magazine, and following the disk being chucked to the recording/replay means, the disk holding member is returned to the magazine.

Also, in the disk ejection operation of returning the disk chucked to the recording/replay means to the magazine, the output of the driving source is transferred via the selecting mechanism to the disk holding member transporting means, chucking means, and disk holding member transporting means in that order, thereby extracting the disk holding member from the magazine, and following the disk being chucked to the recording/replay means, the disk holding member is returned to the magazine.

Thus, the output of the single driving source is not directly transferred to the disk holding member transporting means and chucking means, but a selecting mechanism is provided between both means, so that directional independence of both means can be secured, as compared to cases wherein both means are directly driven by using a single driving source such as a cam gear or the like. In other words, the disk holding member transporting means and chucking means can be driven separately and selectively including the corresponding relation of the directionality with the driving source according to the construction of the selecting mechanism, and accordingly, there is no limitation die to the operation of the chucking means, and a 1-to-1 correspondence relation can easily be maintained between the direction of rotation of the driving source and the direction of operation of the disk holding member. Also, such a selecting mechanism can be easily realized with a small and simple construction using various gears such as gears or cam gears having gullets, planetary gears, and so forth.

Further in accordance with the invention, the driving means and chucking means thereof are constructed as follows. The driving means is constructed so as to rotate in a certain direction, and the chucking means is constructed so as to continuously perform chucking operation and chucking disengaging operation, based on the rotation in the certain direction of the driving source.

According to the above configuration in accordance with the invention, the following effects can be obtained.

In the above described disk loading operation and disk ejecting operation, the chucking means performs chucking operations and chucking disengaging operations, which are entirely opposite operations. In such a case, in the event that the chucking operation and chucking disengaging operation are simply corresponded with the two rotational directions of the driving source, the chucking means has to perform chucking operation or chucking disengaging operation each time the driving source is reversed in the direction of rotation thereof, making it difficult to maintain a directional corresponding relation between the driving source and the disk holding member transporting means. Also, in order to avoid undesirable chucking operation or chucking disengaging operation due to reversal in the direction of rotation of the driving source, it becomes necessary to restrict the operation of the chucking means according to the operational direction, position, and so forth, of the disk holding member, resulting in a complicated structure.

Conversely, in arrangements according to the invention, chucking operation and chucking disengaging operation is performed continuously regarding rotation of the driving source in a certain direction, so that chucking operation or chucking disengaging operation can be performed in a sure manner at a position appropriately matched with the operation of the disk holding member, simply by appropriately setting the relation between the amount of rotation of the driving source necessary for operation of the disk holding member transporting means, and the amount of rotation of the driving source between the chucking operation and chucking disengaging operation.

In accordance with the invention, the driving means and disk holding member transporting means thereof are constructed as follows. The driving means thereof is constructed so as to perform rotation in two directions, and the aforementioned disk holding member transporting means being constructed so as to extract the aforementioned disk holding members from the aforementioned magazine based on rotation of the aforementioned driving source in one direction, and to return the aforementioned disk holding members to the aforementioned magazine based on rotation of the aforementioned driving source in the other direction.

According to the above configuration in accordance with the invention, the following effects can be obtained.

In the above described disk loading operation and disk ejecting operation, the disk holding member transporting means only needs to perform the same reciprocal operation for both disk loading operation and disk ejecting operation, of transporting the disk holding member in the direction of extracting, and then transporting in the reverse direction (return direction). In the invention, the direction of operation of the disk holding member transporting means and the direction of rotation of the driving source are corresponded, so that in both cases of disk loading operation and disk ejecting operation, the operation direction of the disk holding member can be easily switched simply by switching the rotation direction of the driving source, and even in the event that the power is turned off, the operation being performed before power outage can be resumed.

More specifically, in order to correspond the direction of operation of the disk holding member transporting means and the direction of rotation of the driving source, the selecting mechanism is provided with functions to transfer the directionality of the output of the driving source to the disk holding member transporting means as is, and to disengage the driving source with the disk holding member transporting means when performing chucking or disengaging. Such functions can be easily realized with a small and simple construction using gears having gullets, etc. Particularly, in a combination according to the invention, only the directional corresponding relation between the driving source and the disk holding member transporting means needs to be taken into consideration, with no restriction whatsoever from the chucking operations, thus further reducing the size and complexity of the selecting mechanism.

In accordance with the invention, the selecting mechanism thereof is comprised of an output gear, transporting driving rack, gullet, planetary gear, chucking driving gear, and cam.

Of these, the output gear is constructed so as to rotate in a direction corresponding with the rotation of the aforementioned driving source. Also, the transporting driving rack is provided to the aforementioned disk holding member transporting means and is linked with the aforementioned output gear so as to move the aforementioned disk holding member transporting means by the rotation of the aforementioned output gear. Further, the gullet portion is provided to the linkage portion between the aforementioned output gear and the aforementioned transporting driving rack and is constructed so as to disengage the linkage between the output gear and transporting driving rack in the event that the disk holding member transporting means completes transporting of the aforementioned disk holding member to the aforementioned certain transporting position.

On the other hand, the planetary gear is linked with the aforementioned output gear, and is provided so as to rotate around the periphery of the aforementioned output gear. Also, the chucking driving gear is provided so as to be able to be linked with the aforementioned planetary gear according to the rotational position of the planetary gear, and is constructed so as to drive the aforementioned chucking means by means of the rotation of the aforementioned planetary gear when linked with the planetary gear. Further, the cam is provided so as to move according to the position of the aforementioned disk holding member transporting means. This can is constructed so as to restrict the rotation of the aforementioned planetary gear while the aforementioned disk holding member transporting means transports the aforementioned disk holding member to the aforementioned certain transporting position, and which allows rotation of the aforementioned planetary gear in the direction of linkage with the aforementioned chucking driving gear in the event that the aforementioned disk holding member transporting means completes transporting of the aforementioned disk holding member to the certain transporting position.

According to the above configuration in accordance with the invention, regarding the disk holding member transporting means, the output from the output gear is transferred via the transporting driving rack and the linkage with the output gear is disengaged by means of the gullet, and regarding the chucking means, the output from the output gear is transferred via the planetary gear and chucking driving gear and the linkage with the output gear is disengaged by means of the cam which restricts rotation of the planetary gear.

In the disk loading operation, first, the disk holding member transporting means moves in the extracting direction by means of the rotation of the output gear linked via the transporting driving rack, and at the point that the disk holding member reaches the predetermined transporting position, disengagement with the output gear is conducted by means of the gullet portion. In this case, the rotation of the planetary gear is restricted by means of the cam during operation of the disk holding member transporting means, so the chucking means chucks the disk to the recording/replay means by means of the rotation of the output gear. Subsequently, the disk holding member transporting means is linked to the output gear once more via the transporting driving rack, the disk holding member transporting means is moved in the direction opposite to the extracting direction (return direction) by means of the rotation of this output gear, thereby returning the empty disk holding member to the magazine. Also, the same operation is conducted for the disk ejecting operation as with the disk loading operation, except that chucking disengaging operation is performed instead of chucking operation.

According to the invention, transfer and disengagement of power to the disk holding member transporting means and chucking means can be realized in a sure manner with a small and simple construction comprised of an output gear, transporting driving rack, gullet, planetary gear, chucking driving gear, and cam.

In accordance with with the invention, the output gear and planetary gear are comprised as follows. The output gear is constructed so as to directly mesh with the aforementioned transporting driving rack and also to directly mesh with the aforementioned planetary gear, and wherein the planetary gear is provided so as to rotate around the periphery of the output gear.

According to the above configuration in accordance with the invention, in addition to the effects of the invention described above, a separate gear for linking between the output gear and transporting driving rack or a separate gear for linking between the output gear and planetary gear are unnecessary, so that the number of parts can be reduced, and the selecting mechanism can be reduced in size and simplified.

In accordance with the invention, the selecting mechanism thereof is comprised of an output gear, planetary gear, transporting driving rack, chucking driving gear, and cam, as described below.

Of these, the output gear is configured so as to rotate in a direction corresponding with the rotation of the aforementioned driving source. Also, the planetary gear is linked with the aforementioned output gear, and is provided so as to rotate around the periphery of the aforementioned output gear between first and second rotating positions. Further, the transporting driving rack is provided to the aforementioned disk holding member transporting means and is linked with the aforementioned planetary gear in the event that the planetary gear is at the aforementioned first rotational position so as to move the aforementioned disk holding member transporting means by the rotation of the planetary gear. Also, the chucking driving gear is provided so as to be able to be linked with the aforementioned planetary gear in the event that the planetary gear is at the aforementioned second rotational position, and drive the aforementioned chucking means by means of the rotation of the aforementioned planetary gear when linked with the planetary gear.

Further, the cam is provided so as to move according to the position of the aforementioned disk holding member transporting means. The cam retains the aforementioned planetary gear at the aforementioned first rotational position while the aforementioned disk holding member transporting means transports the aforementioned disk holding member to the aforementioned certain transporting position, and which allows rotation of the planetary gear to the aforementioned second rotational position in the event that the disk holding member transporting means completes transporting of the aforementioned disk holding member to the certain transporting position.

According to the invention, output from the output gear can be selectively transferred to the disk holding member transporting means and chucking means, via the planetary gear. In other words, when causing transportation of the disk holding member, the planetary gear is held at the first rotational position by means of control by the cam and is linked with the transporting driving rack, thereby transferring the output from the output gear to the disk holding member transporting means, and at the point that the disk holding member has been transported to the predetermined transporting position, the planetary gear is released so as to rotate to the second rotational position and is linked with the chucking driving gear, thereby transferring the output from the output gear to the chucking means.

In the disk loading operation, first, the disk holding member transporting means is moved in the extracting direction by means of the rotation of the output gear which is linked via the transporting driving rack and the planetary gear which is at the first rotational position, and the disk holding member is transported to the certain transporting position. In this case, the planetary gear is held at the first rotational position by means of control by the cam during transportation of the disk holding member, and is linked with the transporting driving rack, and on the other hand is disengaged from the chucking driving gear. At the point that the disk holding member transporting means has transported the disk holding member to the predetermined transporting position, the planetary gear is released so as to rotate to the second rotational position and is linked with the chucking driving gear, thereby linking the chucking means to the output gear, whereby the chucking means performs chucking of the disk to the recording/replay means by means of the rotation of the output gear. Subsequently, the planetary gear is retained at the first rotational position once more, thereby linking the disk holding member transporting means to the output gear via the transporting driving rack and the planetary gear, and moving the disk holding member transporting means in the direction reverse to the extracting direction (return direction) by means of the rotation of this output gear, thus returning the empty disk holding member to the magazine. Also, the same operation is conducted for the disk ejecting operation as with the disk loading operation, except that chucking disengaging operation is performed instead of chucking operation.

According to the invention, selective switching of transfer of output to the disk holding member transporting means and chucking means can be realized with a small and simple construction comprised of an output gear, planetary gear, transporting driving rack, chucking driving gear, and cam.

With the invention described, the planetary gear thereof is configured as follows. The planetary gear is provided so as to directly mesh with the output gear and is provided so as to rotate around the periphery thereof.

According to the above configuration in accordance with the invention, in addition to the effects of the invention described above, a separate gear for linking between the output gear and planetary gear becomes unnecessary, so that the number of parts can be reduced, and the selecting mechanism can be reduced in size and simplified.

In accordance with the invention, there is provided a locking member as described next. A locking member is provided between the aforementioned cam and the aforementioned planetary gear, and is rotatably configured between a locking position which locks the planetary gear at the aforementioned first rotational position, and a disengaging position which disengages the lock on the planetary gear and allows rotation of the planetary gear to the aforementioned second rotational position, the motion of the locking mechanism being synchronous with the cam.

According to the above configuration in accordance with the invention, providing a locking member between the cam and planetary gear allows for the position and form of the locking member to be selected, whereby the position and rotational range of the planetary gear can be freely set, thus improving freedom in designing of the selecting mechanism.

With the invention described, the magazine thereof is detachably provided to the disk changer device.

According to the above configuration in accordance with the invention, the magazine is detachably provided to the disk changer device so that exchange of the disks can be easily conducted by removing the magazine from the device.

BRIEF DESCRIPTION OF THE DRAWINGS

Specific description will now be made regarding embodiments of the disk changer device according to the present invention applied to a CD player, with reference to the drawings, in which:

FIG. 5 is a diagram illustrating the principal components of the loading unit 40 shown in FIG. 1, with FIG. 5(A) being a plan view and FIG. 5(B) being a side view.

FIG. 7 is a diagram illustrating the positional relation between the loading gear 54 shown in FIG. 5, the control plate 55, and the motor bracket 46, wherein

FIG. 8 is a diagram illustrating the positional relation between the swing plate 51 shown in FIG. 5 and the transporting plate 43, FIG. 8(A) being a plan view, and FIG. 8(B) being a side view.

FIG. 12 is a plan view illustrating the position relation between the loading gear 54 shown in FIG. 5, the chucking plate 44, and the drive unit 70, wherein

FIG. 13 is a side view illustrating the positional relation between the chucking plate 44 and the loading gear 54 shown in FIG. 12, wherein FIG. 13(A) illustrates the chucking disengagement state, and FIG. 13(B) illustrates the chucking state.

FIG. 14 is a side view illustrating the position relation between the chucking plate 44 and the drive unit 70 shown in FIG. 12, wherein

DETAILED DESCRIPTION

Figure 1:
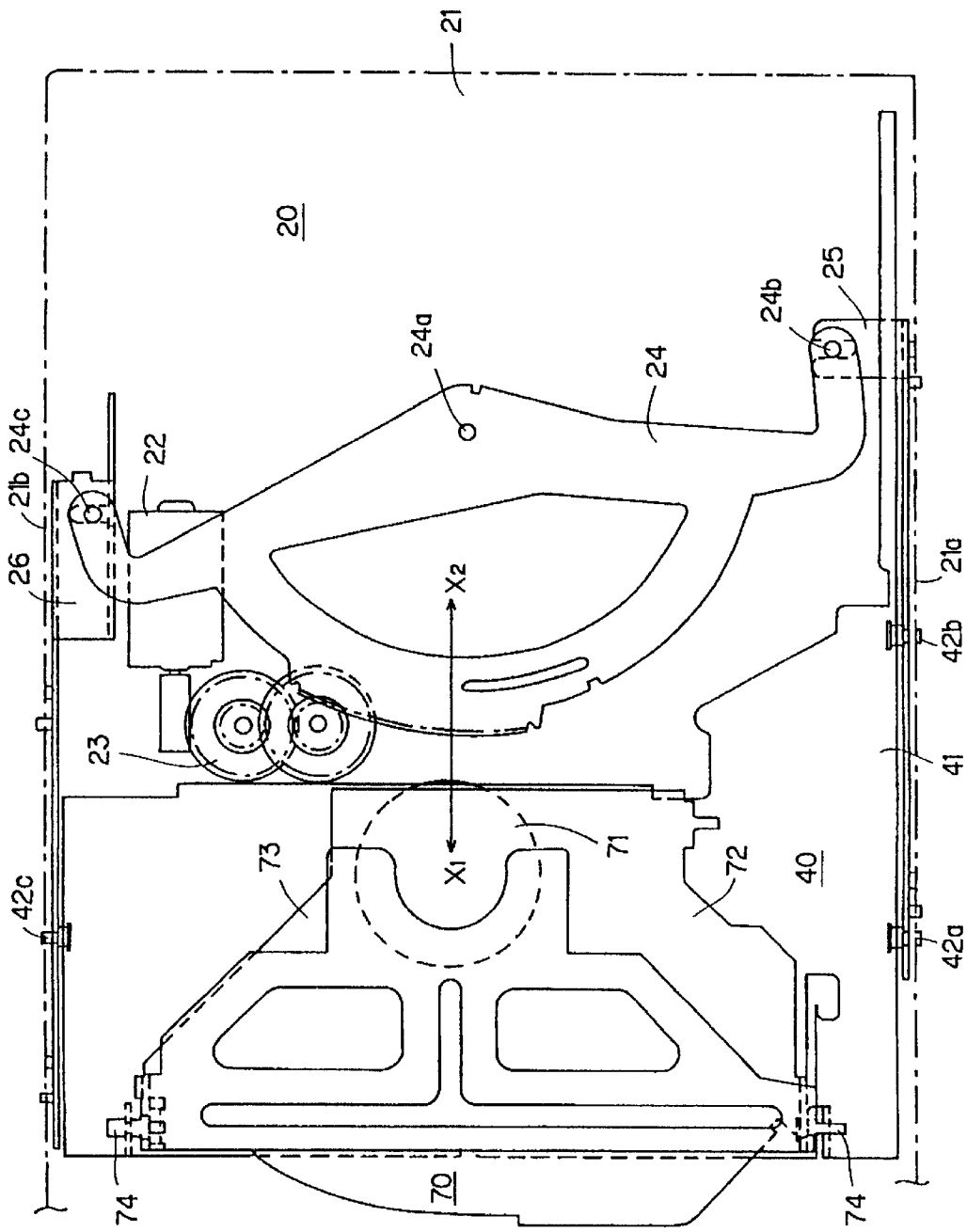
FIG. 1 is a plan view illustrating a schematic construction of a disk changer device applied to a first embodiment of the present invention.
Figure 2:
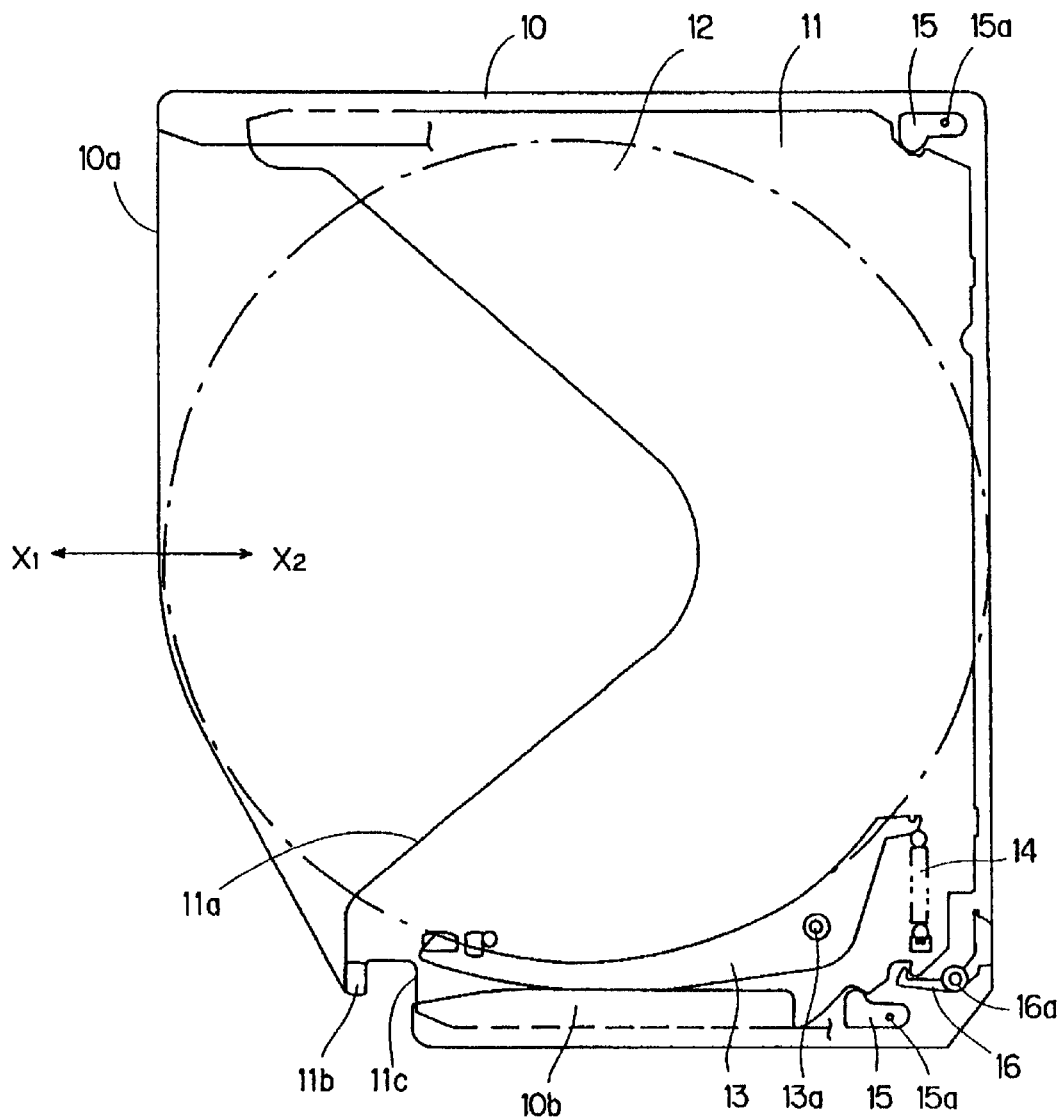
FIG. 2 is an internal plan view illustrating the schematic construction of the magazine 10 used in the disk changer device shown in FIG. 1.

FIG. 1 is a plan view illustrating a schematic construction of a disk changer device relating to a first embodiment of the present invention, this disk changer device being configured so as to work with a magazine 10 having a configuration such as illustrated in FIG. 2. In other words, as shown in FIG. 1, the disk changer device is comprised of a base unit 20 which has functions of selecting the disk holding member and ejecting the magazine, a loading unit 40 which performs loading of the disk holding member, and a drive unit 70 which plays the disk.

Of these, the base unit 20 is configured to movably support the leading unit 40 and mount the magazine 10 as shown in FIG. 2, and is arranged so as to vertically move the loading unit 40 as to the mounted magazine 10, thus conducting position with one of the disk holding members 11 of the magazine 10. Also, the drive unit 70 is constructed of a drive plate 72 having a turntable 71, and a clamp arm 73 and so forth, and is rotatably attached to the loading unit 40 by means of a pair of rotation supporting members 74. In FIG. 1 and FIG. 2, $X_1$ denotes the direction of extracting the disk from the magazine 10, and $X_2$ denotes the direction of returning the disk to the magazine 10.

FIG. 2 is an internal plan view illustrating the schematic construction of the magazine 10. As shown here in FIG. 2, provided within the magazine 10 are a plurality of disk holding members 11 stored in a layered manner so as to be each extractable and replaceable. In this case, the disk holding member 11 is formed in a cylindrical shape which can store only one disk 12. The disk holding member 11 is provided with a disk insertion opening 11a situated on the side of the opening 10a of the magazine 10, and first and second fitting portions 11b and 11c which fit the loading unit 40. This disk holding member 11 is also provided internally with a holding arm 13 rotatably mounted by means of a shaft 13a, and a spring 14 which presses the holding arm 13 toward the disk holding side, and at the point that the disk 12 is inserted from the insertion opening 11 a to the predetermined holding position shown in the Figure with a single-dot broken line, the disk 12 is held by the holding arm 13. Further, the side wall 10b inside the magazine 10 is constructed to come into contact with the side plane of the holding arm 13 so as to restrict the rotation thereof in the event that the disk holding member 11 is held, thereby preventing the disk 12 from falling.

Also provided within the magazine 10 is a pair of spring portions 15 for holding the plurality of disk holding members 11 individually, and a single-unit lock arm 16 for holding all of the plurality of disk holding members 11 all at once, these members being rotatable by means of shafts 15a and 16a. The lock arm 16 is provided in order to prevent the disk holding members 11 from falling out when not mounted to the device, and the lock is disengaged when the magazine 10 is mounted to the base unit 20 shown in FIG. 1.

Figure 3A:
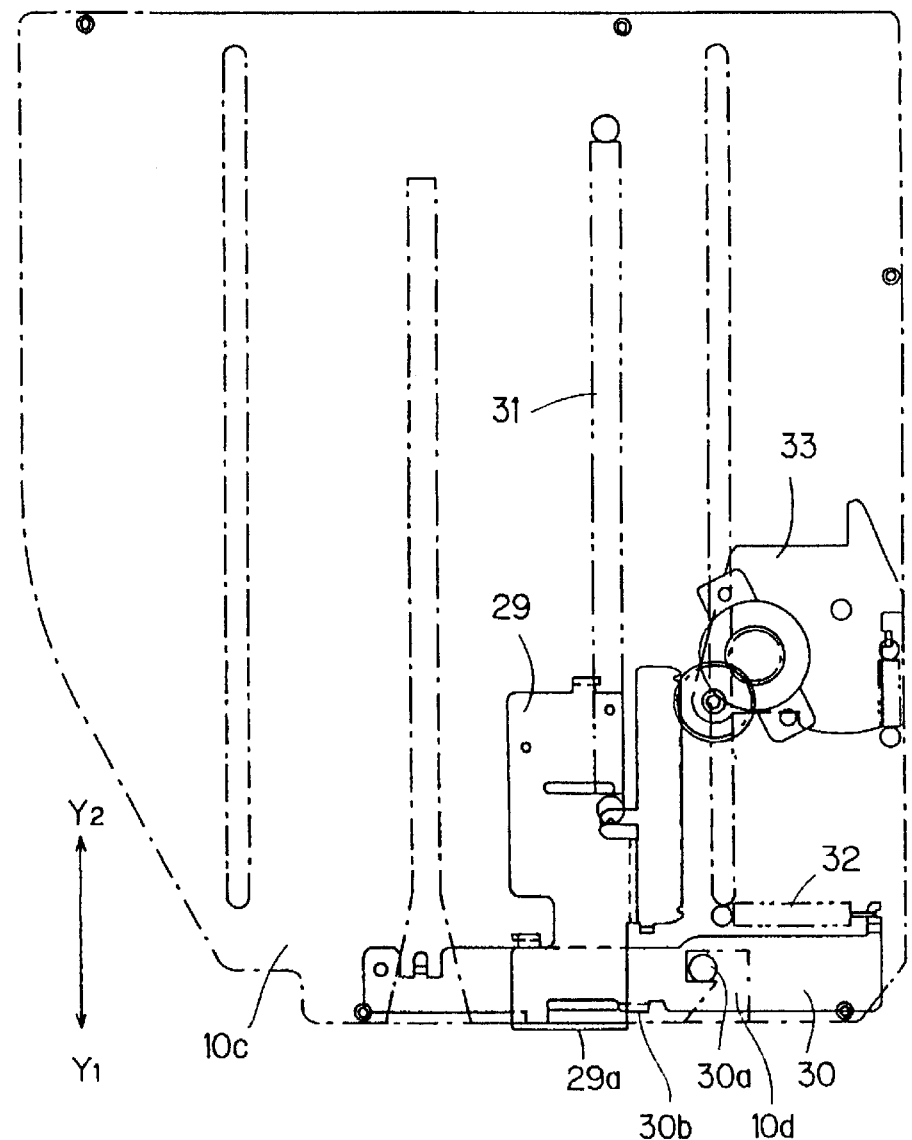
FIG. 3(A) is a plan view illustrating the schematic construction of the mounting portion of the magazine 10 shown in FIG. 2 and base unit 20.

Also, FIG. 3(A) is a plan view illustrating the schematic construction of the mounting portion of the magazine 10 and base unit 20. As shown in FIG. 3(A), a locking groove 10d for locking the magazine 10 to the base unit 20 is provided at one edge of the base plane 10c of the magazine 10, shown in the Figure by a single-dot broken line.

As shown in FIG. 1, the base unit 20 shown in FIG. 1 by a single-dot broken line is comprised of a base plate 21, a shift motor 22 provided to the rear side of the base plate 21, a gear mechanism 22, and a shift link 24, and is also provided with a pair of shift plates 25 and 26 slidably provided to the inner plane of each of the inner walls 21 a and 22b of the base plate 21. In this case, the shift link 24 is constructed so as to be rotatable around the shaft 24a via the gear mechanism 23, by means of driving by the shift motor 22. Also, the shift plates 25, 26 respectively fit the pins 24b and 24c provided to the rotatable edges on both sides of the shift link 24, so as to slide along the side surface of the base plate according to the rotational direction of the shift link 24, thereby vertically moving the loading unit 40 and the drive unit 70 attached thereto.

Figure 4A:
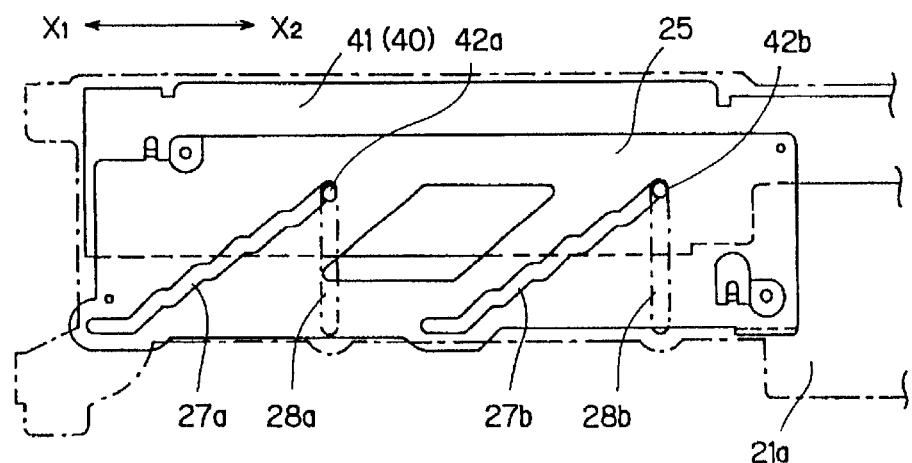
FIG. 4(A) is a side view illustrating the elevating construction of the loading unit 40 by means of the shift plate 25 shown in FIG. 1.
Figure 4B:
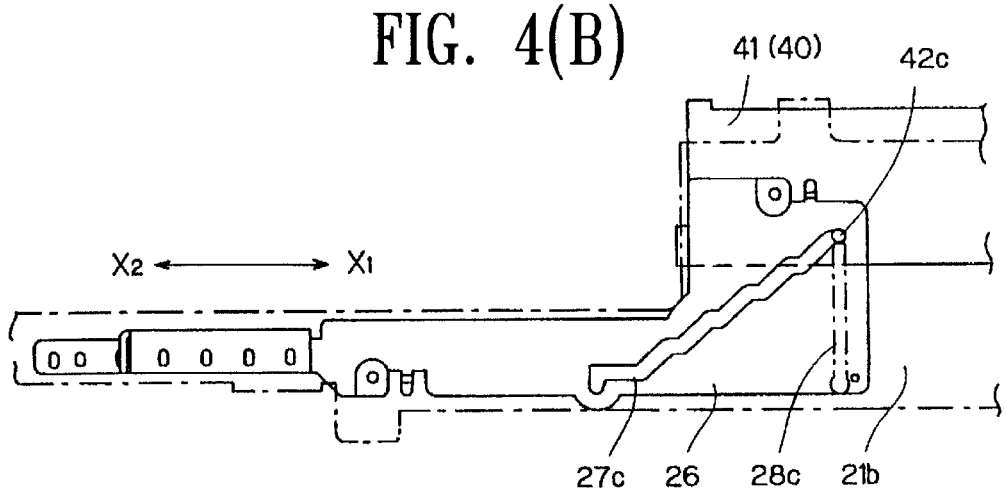
FIG. 4(B) is a side view illustrating the elevating construction of the loading unit 40 by means of the shift plate 26 shown in FIG. 1.

FIG. 4(A) and FIG. 4(B) are side views illustrating the elevating construction of the loading unit 40 by means of the shift plates 25 and 26. Here, as shown in FIG. 4 (A), two stepped cam grooves 27a and 27b are formed to one shift plate 25, and as shown in FIG. 4(B), the other shift plate 26 is provided with one stepped cam groove 27c. Inserted to each of the stepped cam grooves 27a through 27c are pins 42a through 42c provided to the chassis 41 of the loading unit 40. In other words, the loading unit 40 moves vertically accordingly to the horizontal movement of the cam grooves 27a through 27c owing to the pair of shift plates 25 and 26 shifting horizontally, thereby being positioned at the height of a certain disk holding member 11 within the magazine 10. Further, pins 42a through 42c of the loading unit 40 are also inserted into guide grooves 28a through 28c provided on the side walls 21 a and 21b of the base plate 21 and extending vertically, thus serving not only as driving force transmitting means, but also as guiding means for the loading unit 40 as to the base plate 21.

Also, as shown in FIG. 3(A), an ejecting plate 29 is provided to the rear side of the base plate 21 so as to be slidable in the Y direction intersecting the X axis at right angles, and further, a magazine loading plate 30 is provided slidably in the X direction. Of these, provided to the ejecting plate 29 is a contact portion 29a which comes into contact with one side plane of the magazine 10 inserted at the $Y_1$ direction as to the base unit 20. This ejecting plate 29 is pressed in the $Y_2$ direction which is the ejecting direction of the magazine 10, by means of a spring 31 provided between the ejecting plate 29 and the base plate 21.

Figure 3B:
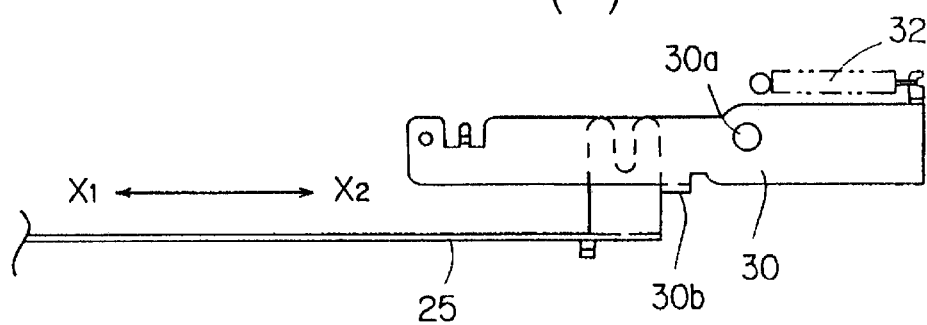
FIG. 3(B) is a plan view illustrating the positional relation between the magazine lock plate 30 shown in (A) and the shift plate 25 shown in FIG. 1.

Also, FIG. 3(B) is a plan view illustrating the positional relation between the magazine loading plate 30 and the shifting plate 25. As shown in this FIG. 3(B), provided to the magazine loading plate 30 is a lock shaft 30a which fits to a locking groove 10d formed in the base surface 10c of the magazine 10 so as to lock the magazine 10, and also, a fitting portion 30b which fits the shift plate 25 is provided. This magazine loading plate 30 is pressed in the $X_1$ direction which is the locking direction of the magazine 10 by means of a spring provided between the magazine loading plate 30 and the base plate 21, and is also pressed in the $X_2$ direction which is the disengaging direction by means of the shift plate 25. Further provided to the rear side of the base plate 21 is a damper unit 33 for inhibiting the operation speed of the ejecting plate 29 so as to inhibit the shock generated between the ejecting plate 29 and the magazine 10, this damper unit 33 being linked with the ejecting plate 29.

FIG. 5 is a diagram illustrating the principal components of the loading unit 40, with FIG. 5(A) being a plan view and FIG. 5(B) being a side view. As shown in FIG. 5, the loading unit 40 is comprised of a transporting plate 43 (disk holding member transporting means) for transporting the disk holding members 11, a chucking plate 44 for driving a drive plate 72 and clamp arm 73, a driving block 45 for driving the plates 43 and 44, and so forth.

In this case, the transporting plate 43 and the chucking plate 44 are both provided slidable in the X direction as to the chassis 41. The transporting plate 43 is provided with a rack (transporting driving rack) 43a which is linked with a laterdescribed loading pinion 50 of the driving block 45, an arm unit 43b for pressing the first and second fitting portions 11b and 11c of the disk holding member 11, and a cam groove 43c for controlling the rotational position of a later-described swing plate 51. Also, provided on one side wall of the chucking plate 44 is a fitting groove 44a for fitting with later-described loading gear 54 of the driving block 45.

Also, the driving block (driving means) 45 is comprised of a motor bracket 46 fixed to the chassis 41, a loading motor (driving source) 47 attached to this motor bracket 46, and a plurality of types of gears and movable plates for transferring the output of this loading motor 47 to the transporting plate 43 and chucking plate 44 in a separate and selective manner. The following is a sequential and detailed description of each portion of the loading unit 40, beginning with the driving block 45.

Figure 6A:
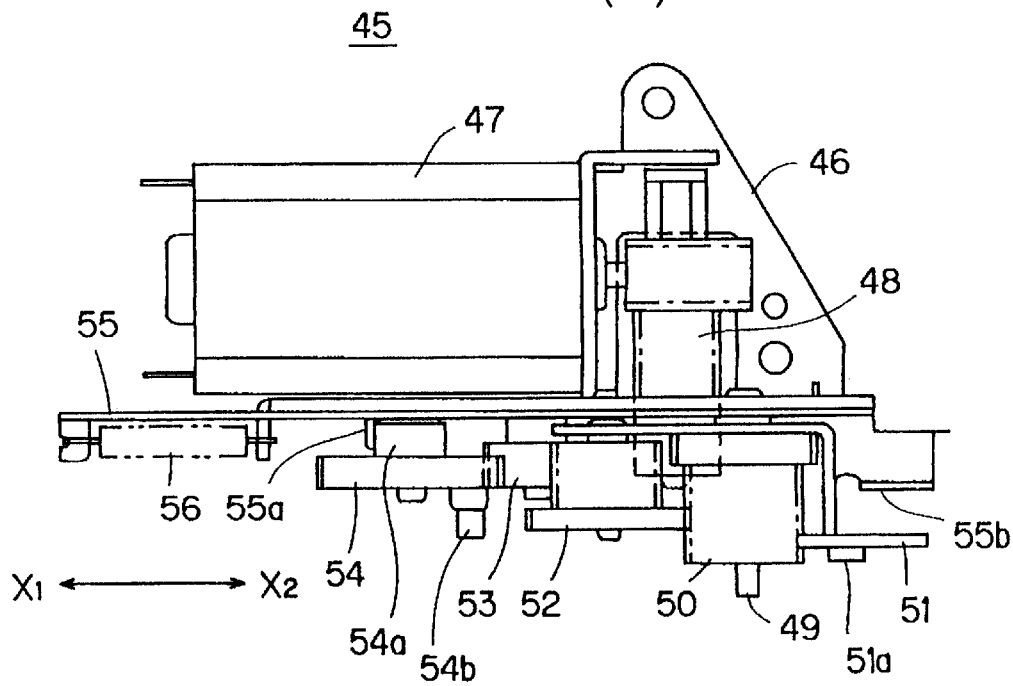
FIG. 6 is a diagram illustrating the configuration of the driving block 45 shown in FIG. 5, with FIG. 6(A) being a plan view and FIG. 6(B) being a side view.
Figure 6B:
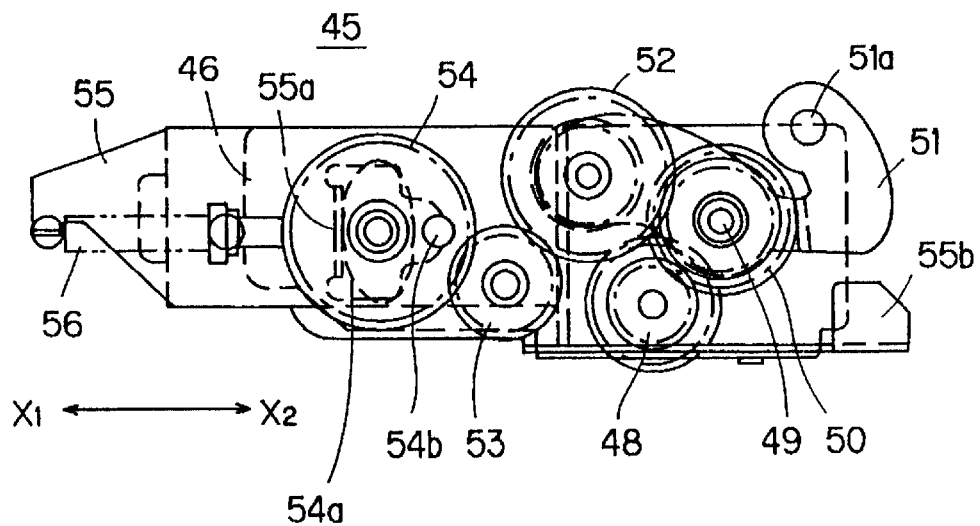

FIG. 6 is a diagram illustrating the configuration of the driving block 45, with FIG. 6(A) being a plan view and FIG. 6(B) being a side view. As shown in FIG. 6, the driving block 45 is comprised of a motor bracket 46 and a loading motor 47, and further a worm mechanism 48, pinion shaft 49, loading pinion 50, swing plate 51, swing gear 52, linkage gear 53, loading gear 54, control plate 55, and so forth.

First, provided to the output side of the loading motor 47 on the motor bracket 46 is a worm mechanism 48, which passes through the main wall of the motor bracket 46 which extends parallel to the loading motor 47, and extends to the opposite side of the loading motor 47. Also, provided to the main wall of the motor bracket 46 is a pinion shaft 49, attached so as to extend to the opposite side of the loading motor 47, with a loading pinion (output gear) 50 which drives the transporting plate 43 being attached to this pinion shaft 49. This loading pinion 50 is comprised of a large diameter gear member and a small diameter gear member, with the large diameter gear member perpetually meshing with the worm mechanism 48, and the small diameter gear member perpetually meshing with a later-described swing gear 52 and also meshing with the rack 43a of the transporting plate 43. In other words, the output of the loading motor 47 is transferred to this loading pinion 50 via the worm mechanism 48, so as to drive the transporting plate 43 in the X direction.

The pinion shaft 49 is provided with the swing plate 51 so as to press against the loading pinion 50, and so as to rotate in the direction of rotation of the loading pinion 50. A position restricting pin 51 a is provided to one rotational free end of the swing plate 51, so as to be inserted into the cam groove 43c of the transporting plate 43 and thus restricting the rotational position of the swing plate 51. Also, provided to the other rotational free end of the swing plate 51 is a swing gear (planetary gear) 52. This swing gear 52 is comprised of a large diameter gear member and a small diameter gear member, with the large diameter gear member perpetually meshing with the small diameter gear member of the loading pinion 50, and the small diameter gear member being capable of meshing with the linkage gear 53 depending on the rotational position of the swing plate 51. This linkage gear 53 is perpetually meshing with the loading gear 54, these gears 53 and 54 both being attached to the motor bracket 46.

Now, as shown in FIG. 6(A), the loading gear (chucking driving gear) 54 comprises on one side a cam 54a for driving the control plate 55, and comprises on the other side a driving pin 54b for driving the chucking plate 44. This driving pin 54b is inserted into the fitting groove 44a of the chucking plate 44 as shown in FIG. 5 (B), and is arranged so as to drive the chucking plate 44 in the X direction according to rotation of the loading gear 54.

Figure 7A:
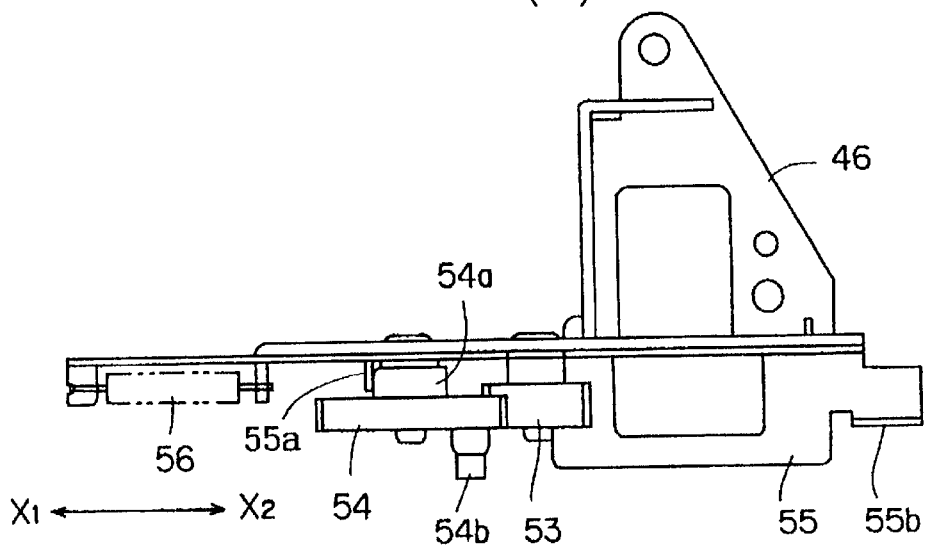
FIG. 7(A) is a plan view.
Figure 7B:
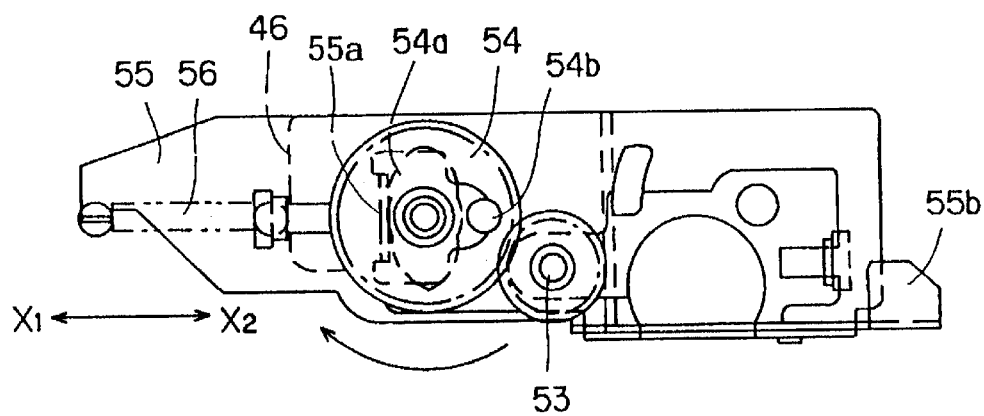
FIG. 7(B) is a side view.

FIG. 7 is a diagram illustrating the positional relation between the loading gear 54 of the driving block 45, the control plate 55, and the motor bracket 46. FIG. 7(A) is a plan view, and FIG. 7(B) is a side view. A shown in FIG. 7, the control plate 55 is positioned so as to overlap with the main wall of the motor bracket 46, and is provided so as to be slidable in the X direction as to the motor bracket 46. This control plate 55 is provided with a fitting potion 55a which fits to the cam 54a of the loading gear 54, and a pressing portion 55b which presses the later-described transporting plate holder 57. Also, the control late 55 is pressed in the $X_2$ direction which is the direction of contact with the cam 54a of the loading gear 54, by means of the spring 56 provided between the control plate 55 and the motor bracket 46.

FIG. 8 is a diagram illustrating the positional relation between the swing plate 51 of the driving block 45 and the transporting plate 43, FIG. 8(A) being a plan view, and FIG. 8(B) being a side view. As shown in this FIG. 8, the transporting plate 43 is a member which extends in the X direction which is the sliding direction thereof, and the rack 43a and the cam 43c are formed so as to extend in the X direction following this transporting plate 43. Of these, a gullet 43e for disengaging the transporting plate 43 from the loading pinion 50 of the driving block 45 is provided to the end potion of the rack 43a, and a release portion 43e for releasing the position restricting pin 51a so as to allow the swing plate 51 to rotate in the case that the loading pinion 50 has reached the gullet 43d of the transpiration plate 43 is provided to the cam groove 43c. Further, a fitting portion 43f for fitting with a later-described transporting plate holder 57 is provided near the release portion 43e of the transporting plate 43.

Figure 9A:
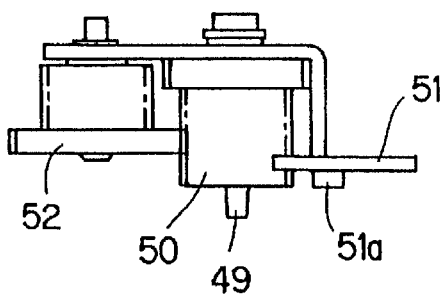
FIG. 9(A) is a plan view illustrating the positional relation between the loading pinion 50 shown in FIG. 5, swing plate 51, and the swing gear 52.
Figure 9B:
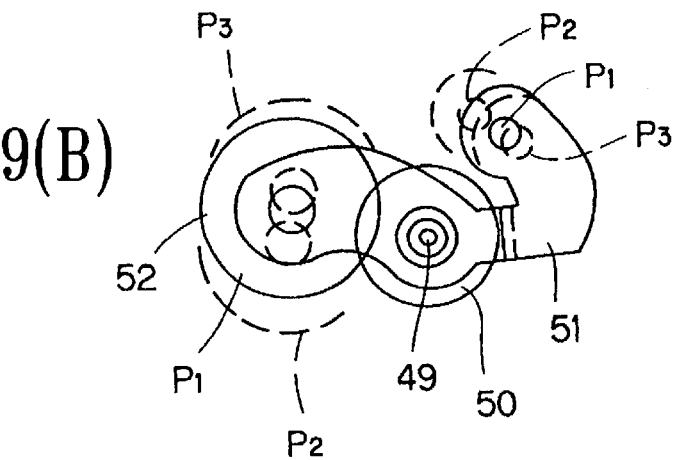
FIG. 9(B) is a side view illustrating the three positions of the swing plate 51.

FIG. 9(A) is a plan view illustrating the positional relation between the loading pinion 50, swing plate 51, and the swing gear 52, and FIG. 9(B) is a side view illustrating the three positions of the swing plate 51. As shown in this FIG. 9(B), the swing plate 51 is arranged so as to take three positions, namely an idling position $P_1$ which is an intermediate position, and on either side thereof are the chucking position $P_2$ and the eject position $P_3$. In other words, in the event that the position restricting pin 51a inserted into the cam groove 43c of the transporting plate 43 is at the long and narrow position of the cam groove, the swing plate 51 is at the idling position $P_1$, and at the point that the position restricting ping 51a reaches the release potion 43e of the cam groove 43c, the swing plate 51 can move to either the chucking position $P_2$ or the eject position $P_3$. FIG. 8(B) shows the position of the position restricting pin 51a corresponding to such positions of the swing plate 51.

Figure 10:
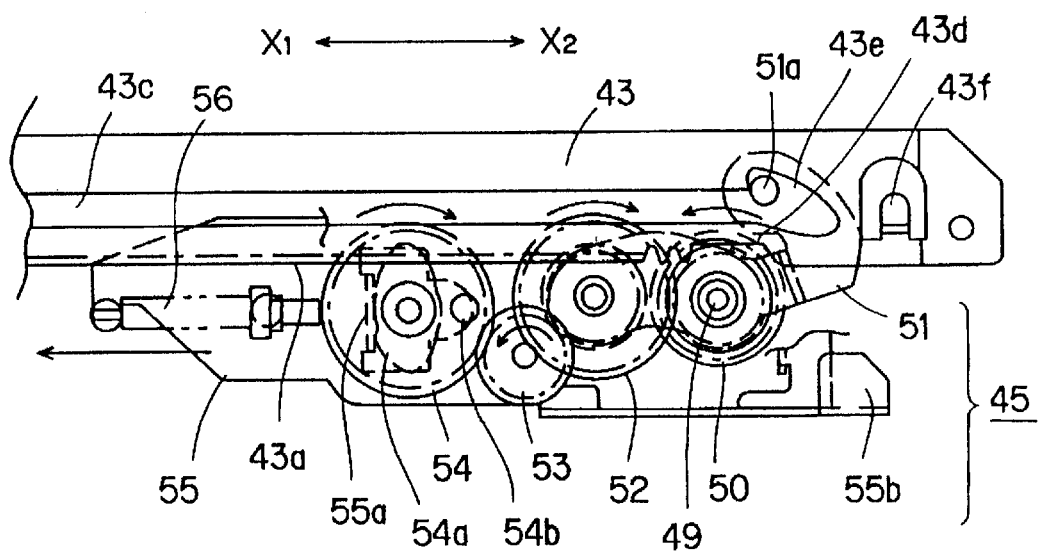
FIG. 10 is a side view illustrating the state of the swing plate 51 shown in FIG. 5 having rotated and the swing gear 52 being linked with the loading gear 54.

Also, FIG. 10 is a side view illustrating the state of the swing plate 51 having rotated and the swing gear 52 being linked with the loading gear 54, partway though the disk loading operation. In other words, at the initial state of disk loading, the swing plate 51 which had been restricted to the idling position $P_1$ as shown in FIG. 8 (B) is rotated in the rotational direction of the loading pinion 50, and moves to the chucking position $P_2$.

Figure 11A:
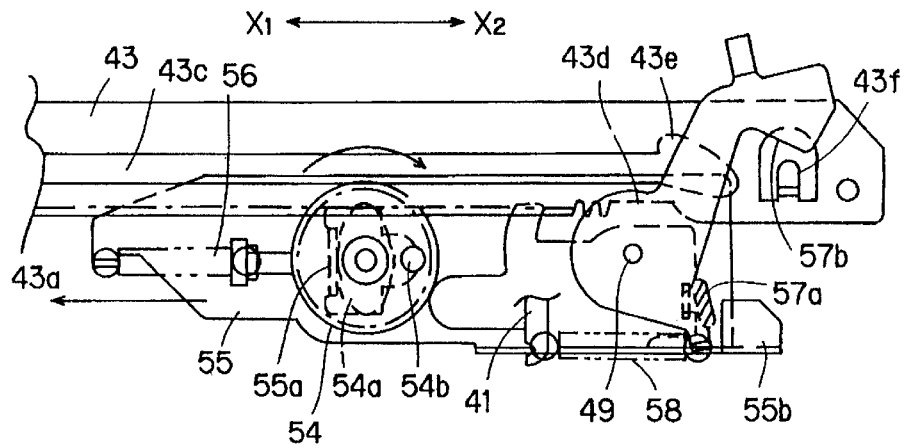
FIG. 11 is a diagram illustrating the positional relation between the transporting plate 43 and the control plate 55 shown in FIG. 5, with FIG. 11(A) being a side view illustrating the time at which the control plate 55 begins to move, FIG. 11(B) being a side view illustrating the time at which movement of the control plate 55 is completed, and FIG. 11(C) being a side view illustrating FIG. 11(B) from a different direction.
Figure 11B:
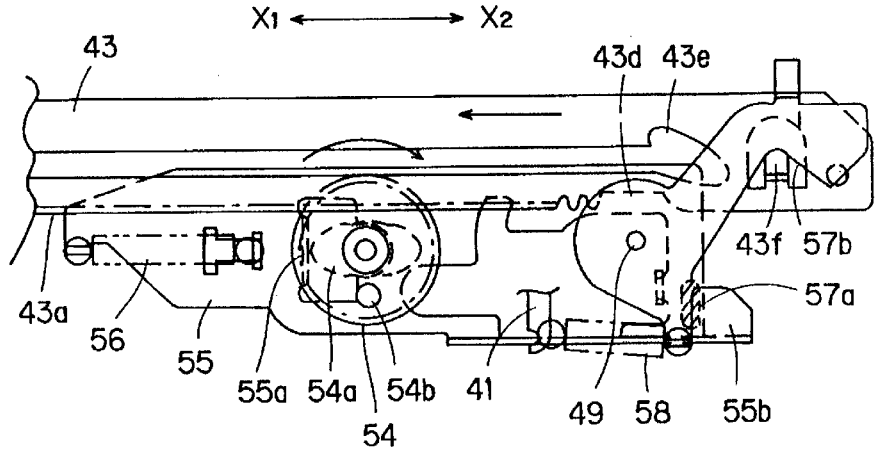
Figure 11C:
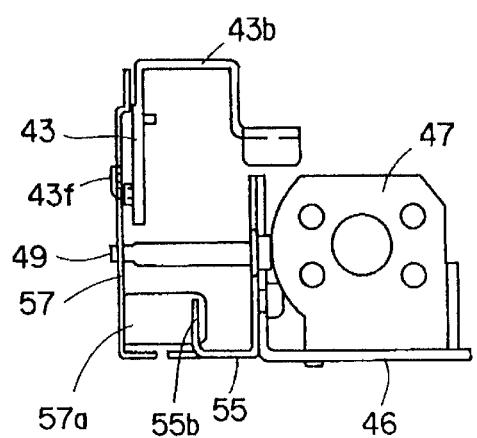

Further, FIG. 11 is a diagram illustrating the positional relation between the transporting plate 43 and the control plate 55, with FIG. 11(A) being a side view illustrating the time at which the control plate 55 begins to move, FIG. 11(B) being a side view illustrating the time at which movement of the control plate 55 is completed, and FIG. 11(C) illustrating FIG. 11(B) from a different direction. As shown in this FIG. 11, rotatably provided to the output plane of the transporting plate 43 of the loading shaft 49 is a transporting plate holder 57 for moving the transporting plate 43 after being disengaged from the loading pinion 50 and holding the transporting plate 43 at this position. This transporting plate holder 57 is provided with a spring-like fitting portion 57a which is pressed in the $X_1$ direction by means of the pressing portion 55b of the control plate 55, and a pressing portion 57b which presses the fitting portion 43f of the transporting plate 43 in the $X_1$ direction. Also, the transporting plate holder 57 is pressed by means of a transporting plate holder spring 58 provided between the transporting plate holder 57 and the chassis 41, so as to press the transporting plate 43.

Figure 12A:
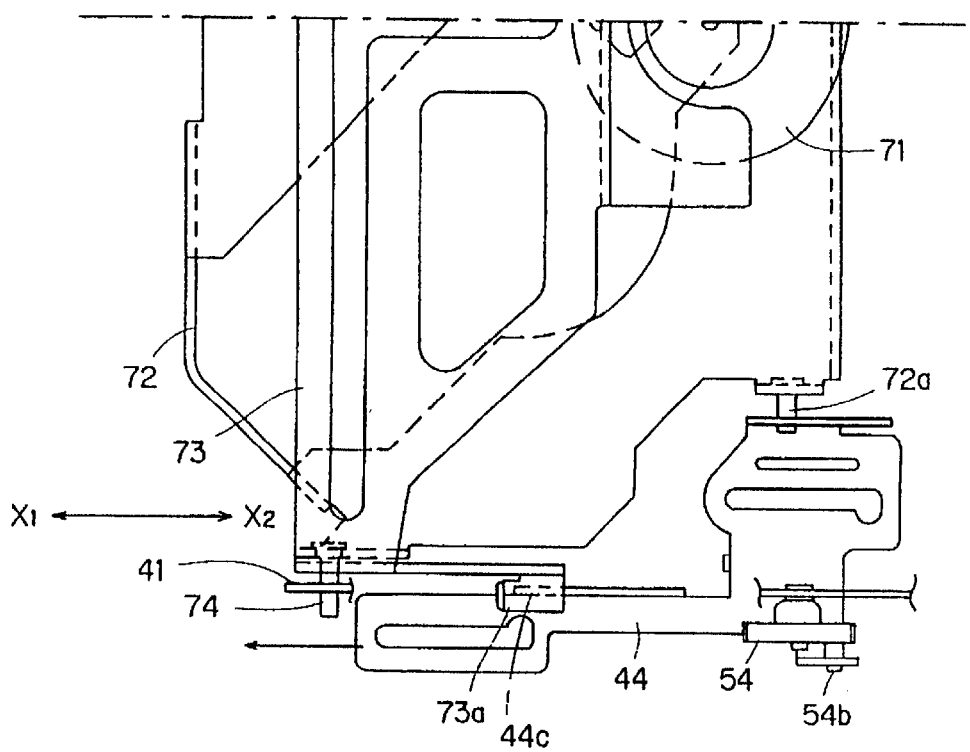
FIG. 12(A) illustrates the chucking disengagement state.
Figure 12B:
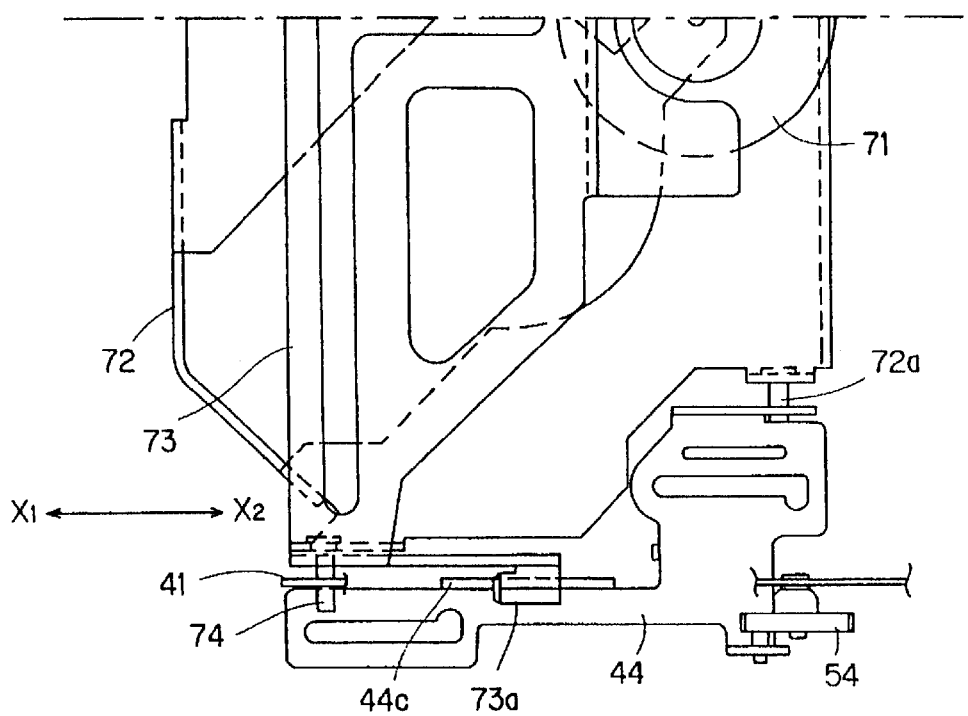
FIG. 12(B) illustrates the chucking state.

FIG. 12 is a plan view illustrating the position relation between the loading gear 54 of the driving block 45, the chucking plate 44, and the drive unit 70, FIG. 13 is a side view illustrating the positional relation between the chucking plate 44 and the loading gear 54, and FIG. 14 is a plan view illustrating the position relation between the chucking plate 44 and the drive unit 70. In the FIGS. 12 through 14, part (A) of each illustrates the chucking disengagement state, and part (B) of each illustrates the chucking state, respectively.

First, as shown in FIG. 13, the driving pin 54b of the loading ear 54 is inserted into a fitting groove 44a provided to one side wall of the chucking plate 44, so that the chucking plate 44 is driven in the X direction by means of driving pin 54b moving in the X direction according to rotation of the loading gear 54. Also, as shown in FIG. 14, a fitting groove 44b is provided to the other side wall of the chucking plate 44 with a pin 72a attached to the side surface of the drive plate 72 being inserted into the cam groove 44b, this drive plate 72 being vertically movable by means of the X-directional movement of the chucking plate 44. Further, provided to the chucking plate 44 is a pressing portion 44c which presses the contact portion 73a provided to the clamp arm 73 in the chucking disengaging direction. Also, a spring 75 is provided between the clamp arm 73 and the chassis 41, pressing the clamp arm 73 in the chucking direction.

Figure 15A:
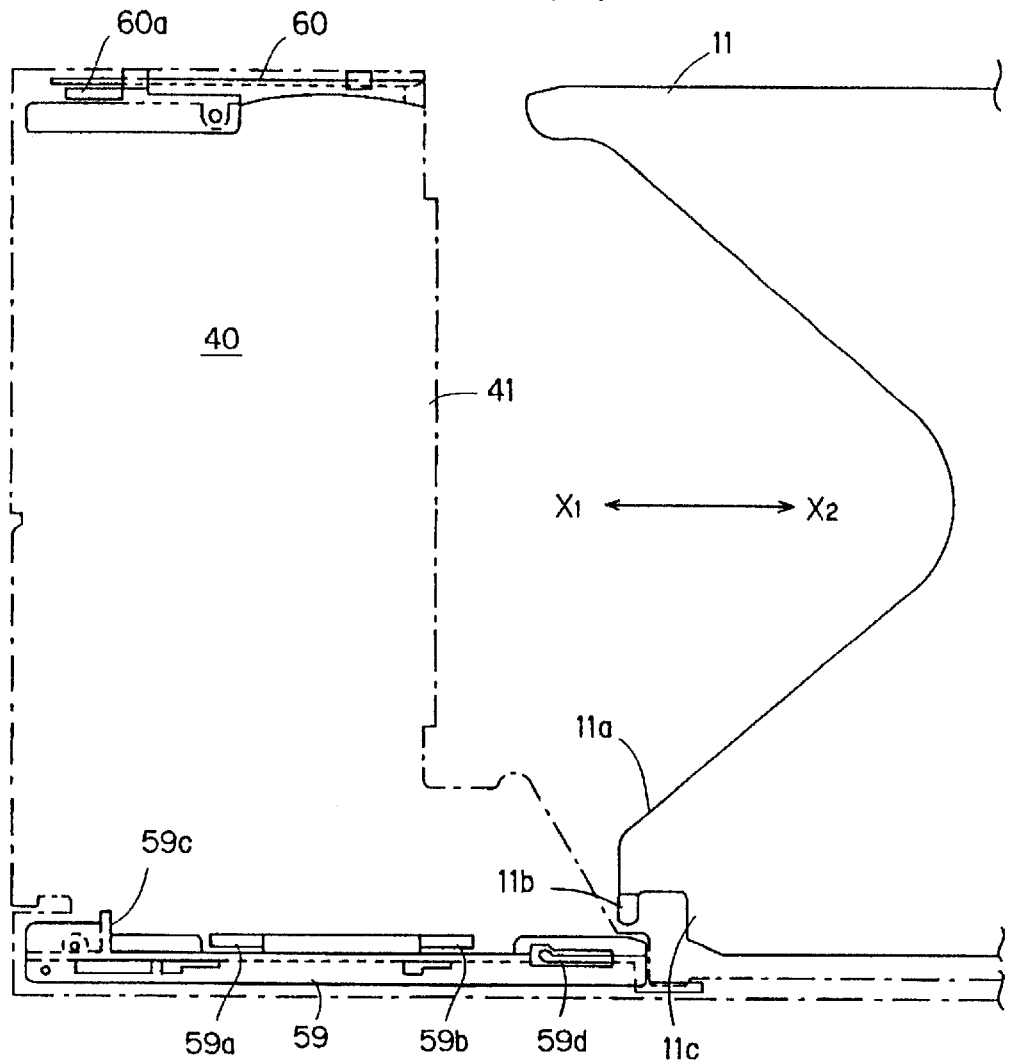
FIG. 15(A) is a plan view illustrating both guide rails 59 and 60 attached to the loading unit 40 shown in FIG. 1.
Figure 15B:
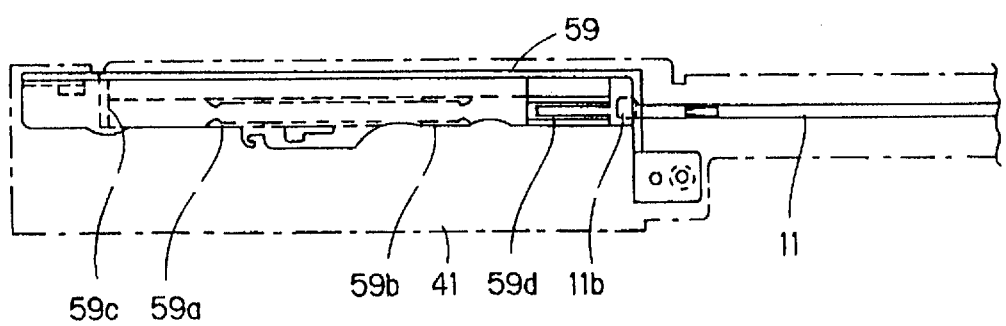
FIG. 15(B) is a side view illustrating one guide rail 59.

As shown in FIG. 15, attached on either side of the chassis 41 of the loading unit 40 is a pair of guide rails 59 and 60 for guiding the disk holding member 11. Now, FIG. 15(A) is a plan view illustrating both guide rails 59 and 60, and FIG. 15(B) is a side view illustrating one guide rail 59. As shown in this FIG. 15, two spring-like pinching portions 59a and 59b are provided to the one guide rail 59, and a single spring-like pinching portion 60a is provided to the other guide rail 60. These springlike pinching portions 59a, 59b, and 60a are each formed of a pair of vertically opposing finger-like members, as shown in FIG. 15(B), and are arranged so as to be able to pinch the edge of the disk holding member 11 from both above and below, thereby maintaining the disk holding member 11 at a constant height. Further, provided to the guide rail 59 are a positioning portion 59c which performs positioning of the disk holding member 11 in the X direction by coming into contact with the edge surface of the first fitting portion 11b of the disk holding member 11, and a positioning portion 59d which performs positioning of the disk holding member 11 in the Y direction by coming into contact with the side surface of the disk holding member 11.

Figure 16A:
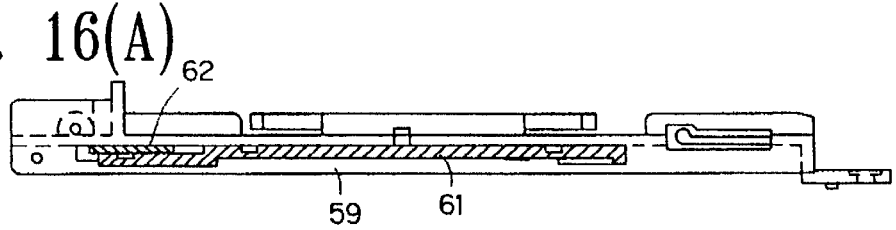
FIG. 16(A) is a plan view of the starter rack 61 attached to the guide rail 59 and the starter link 62 shown in FIG. 15.
Figure 16B:
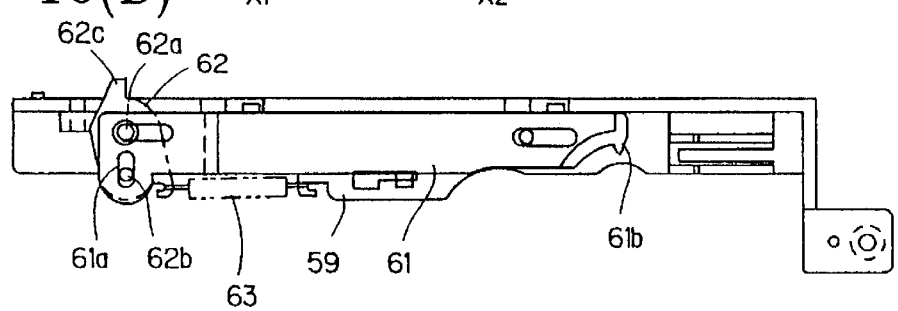
FIG. 16(B) is a side view.

As shown in FIG. 16, provided to the one guide rail 59 are a starter rack 61 and starter link 62 for meshing the transporting plate 43 with the loading pinion 50. Now, FIG. 16(A) is a plan view, and FIG. 16(B) is a side view. As shown in this FIG. 16, the starter rack 61 is an elongated member extended in the X direction, and is slidably attached to the guide rail 59. Also, the starter link 62 is attached so as to be rotatable around the shaft 62a attached to the guide rail 59.

Figure 17A:
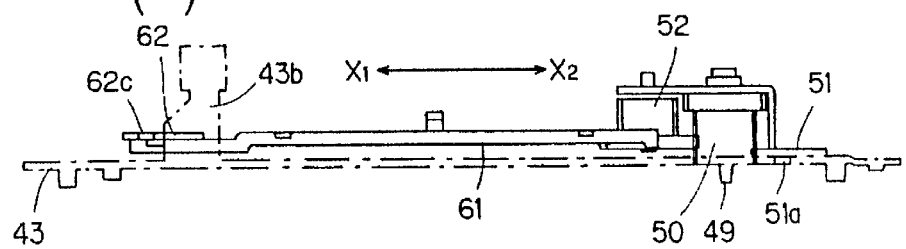
FIG. 17 is a diagram illustrating the positional relation between the starter rack 61 and starter link 62 shown in FIG. 16, the swing gear 52, and the transporting plate 43 shown in FIG. 8, with FIG. 17(A) being a plan view illustrating the state of the swing gear 52 meshing with the starter rack 61, FIG. 17(B) being a side view thereof, and FIG. 17(C) being a side view illustrating the state wherein the starter rack 61 has moved from the state shown in FIG. 17(B) and the starter link 62 has been rotated.
Figure 17B:
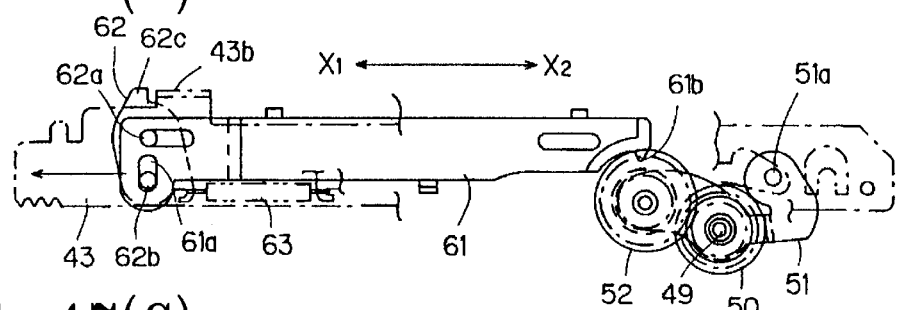
Figure 17C:
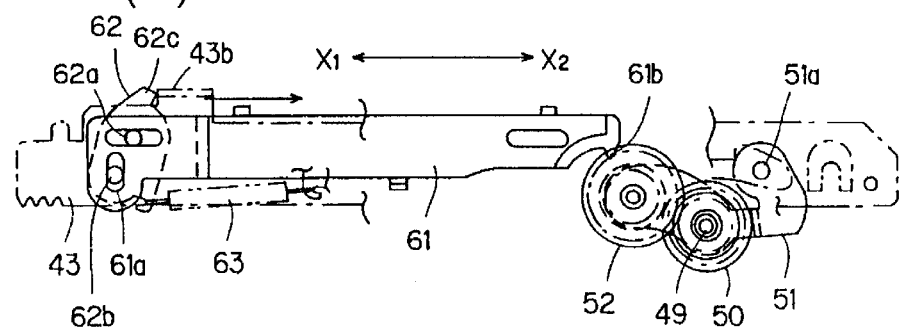

FIG. 17 is a diagram illustrating the positional relation between the starter link 62, the swing gear 52, and the transporting plate 43, with FIG. 17(A) being a plan view illustrating the state of the swing gear 52 meshing with the starter rack 61, FIG. 17(B) being a side view thereof, and FIG. 17(C) being a side view illustrating the state wherein the starter rack 61 has moved from the state shown in FIG. 17(B) and the starter link 62 has been rotated.

As shown in FIG. 17, the starter rack 61 is provided with a fitting groove 61a so as to fit with the starter link 62, and a tooth 61b capable of engaging the swing gear 52, whereby the starter rack 61 meshes with the swing gear 52 and moves in the $X_1$ direction, and rotates the starter link 62. Also, the starter link 62 is comprised of a pin 62b inserted into the fitting groove 61 a of the starter rack 61, and a pressing portion 62c for pressing the arm unit 43b of the transporting plate 43, and also is pressed in a non-pressing direction by means of a spring 63 provided between the starter link 62 and the guide rail 59. In other words, this starter link 62 is arranged so that when it is rotated by the movement of the starter rack 61 in the $X_1$ direction, the pressing portion 62c thereof presses the arm unit 43b of the transporting plate 43 in the $X_2$ direction, thus moving the transporting plate 43.

According to the embodiment of the present invention having a construction such as described above, operations of mounting the magazine, operations of selecting the disk holding member, operations of disk loading, operations of disk ejecting, and operations of ejecting the magazine can be performed well. Particularly according to the present embodiment, the disk loading operation and the disk ejecting operation share much in common. The following is separate descriptions of the details of each operation and the initial state before operation, and the commonness between the disk loading operation and the disk ejecting operation.

In the event of mounting the magazine 10 shown in FIG. 2 to the base plate 21 shown in FIG. 1, the height of the base surface 10c of the magazine 10 shown in FIG. 3 and the X-directional position thereof is positioned as to the base plate 21, and then the magazine 10 is slid in the $Y_1$ direction. Once the magazine 10 is slid to the predetermined position, the side on the $Y_1$ direction comes into contact with the contact portion 29a of the ejecting plate 29 provided to the base plate 21. Accordingly, the ejecting plate 29 is pressed against the force of the spring 31 and thus the magazine 10 is moved to the predetermined mounting position as shown in FIG. 3. In this case, the lock shaft 30a of the magazine locking plate 30 provided to the base plate 21 enters the depth of the fitting groove 10d provided to the base surface 10c of the magazine 10 via the slanted side surface thereof, so that the magazine 10 is locked to the mounting position thereof by means of the magazine locking plate 30.

When performing replay of the disk 12 held by one of the disk holding members 11 within the magazine 10, there is the necessity to perform vertical positioning of the leading unit 40, such operation of selecting the disk holding member 11 is performed as follows with the present embodiment.

First, the shift link 24 is driven by means of rotation of the shift motor 22 shown in FIG. 1 by means of the gear mechanism 23, and this shift link is moved by a certain mount in a certain direction corresponding with the disk holding member 11 which is the object of this shift link 24. Consequently, the pair of shift plates 25 and 26 which are fit to either side of the shift link 24 via pins 24b and 24c move in the $X_1$ direction or the $X_2$ direction according to the direction and amount of rotation of the shift link 24, by a certain amount. Also, in this case, the pair of shift plates 25 and 26 are driven in opposite direction. Then, accompanying the movement of this pair of shift plates 25 and 26 in the X direction, the loading unit 40 is vertically driven via the cam grooves 27a through 27c shown in FIG. 4 and the pins 42a through 42c thereof, thus positioning the loading unit 40 at the height corresponding with the disk holding member 11 in question.

In the initial state before disk loading, the transporting plate 43 is at the most $X_2$ direction-wise position, as shown in FIG. 8(B), and the rack 43a thereof meshes with the loading pinion 50 at the farthest $X_1$ direction-wise end. Also, the position restricting pin 51 a of the swing plate 51 is at the farthest $X_1$ direction-wise end of the cam groove 43c of the transporting plate 43, with the swing plate 51 being restricted at the idling position $P_1$. Consequently, the small diameter gear member of the swing gear 52 is not meshed with the linkage gear 53, as shown in FIG. 6(B), and as a result, is disengaged from the loading gear 54. In this case, the large diameter gear member of the swing gear 52 is also disengaged from the starter rack 61 as shown in FIG. 17, so that the starter link 62 is at a counter-clockwise directional position such as shown in FIG. 17(B), due to the pressing of the spring 63.

Also, after selecting the disk holding member 11 as described above, the. leading end of the arm unit 43b of the transporting plate 43 is between the first and second fitting portions 11b and 11c (FIG. 2) of the selected disk holding member 11.

Figure 14A:
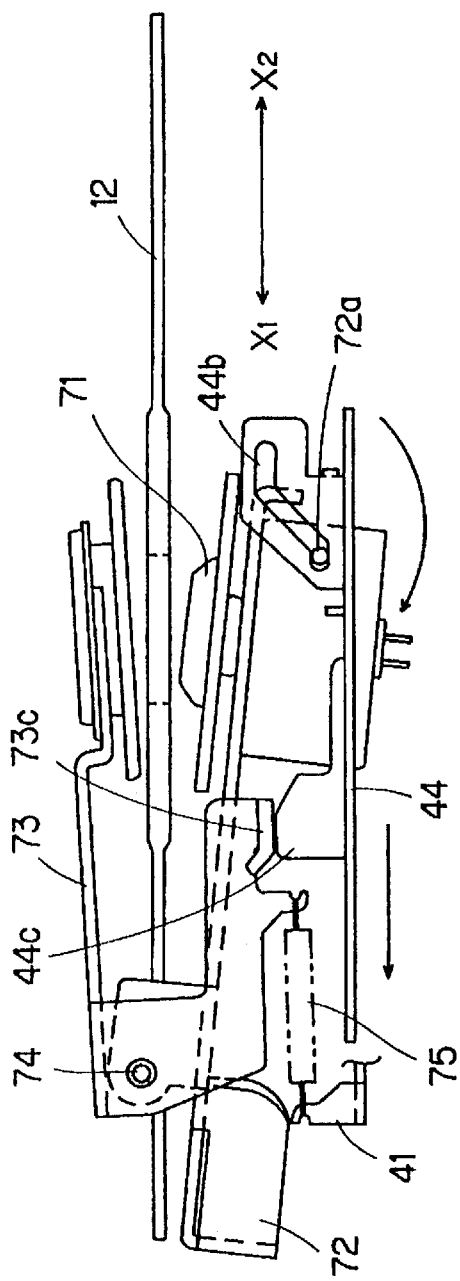
FIG. 14(A) illustrates the chucking disengagement state.

On the other hand, as shown in FIG. 12(A), the chucking plate 44 is at the most $X_2$ direction-wise position, so as shown in FIG. 14(A), the drive unit 70 is in a chucking disengagement state wherein the clamp arm 73 and the drive plate 72 are vertically distanced. In other words, the clamp arm 73 has the contacting portion 73a thereof fitting the pressing portion 44c of the chucking plate 44, and is held in an upward position by means of this pressing portion 44c. Also, the drive plate 72 has the pin 72a thereof below the cam groove 44b of the chucking plate 44, and thus is held in a lower position.

In order to play the disk 12 from an initial state such as described above, the disk holding member 11 is selected by the aforementioned selecting operation, and then a disk loading operation is performed, this disk loading operation comprising a three-step operation of: (1) operation of extracting the disk holding member; (2) operation of chucking the disk; and (3) operation of returning the disk holding member. The details of the disk loading operation are as described below.

First, the loading motor 47 shown in FIG. 5(A) is rotated in the predetermined direction, the output thereof is transferred to the loading pinion 50 via the worm mechanism 48, and the loading pinion 50 is rotated in a counter-clockwise direction in the Figure, as shown by an arrow in FIG. 8(B). Along with this rotation of the loading pinion 50, the transporting plate 43 moves in the $X_1$ direction via the rack 43a, and the leading end of the arm unit 43b presses out the first fitting member 11b of the disk holding member 11, thus extracting the disk holding member 11 holding the disk 12 from the magazine 10.

When the transporting plate 43 moves in the $X_1$ direction by a predetermined amount, the position restricting pin 51 a of the swing plate 51 reaches the release portion 43e of the cam groove 43c and becomes rotatable, as shown in FIG. 10, so the swing plate 51 rotates on a counter-clockwise direction according to the rotational direction of the loading pinion 50, and moves from the idling position $P_1$ to the chucking position $P_2$ Immediately afterwards, the loading pinion 50 reaches the gullet 43d of the transporting plate 43, so the transporting plate 43 stops approximately 1 mm before the predetermined transporting position.

Also, as shown in FIG. 10, the swing gear 52 meshes with the linkage gear 53 by means of the swing plate 51 rotating to the chucking position $P_2$ and is linked with the loading gear 54, so a driving path is formed, starting with the loading pinion 50, passing through the swing gear 52 and linkage gear 53, and reaching the loading gear 54. In other words, the loading begins clockwise rotation by means of rotation of the loading pinion 50 in the counter-clockwise direction, via this driving path.

Then, once the loading gear 54 starts clockwise rotation as described above, the control plate 55 starts motion in the $X_1$ direction via a cam 54a formed on one side thereof and a contact portion 55a, as shown in FIG. 11(A). Thus, once the control plate 55 moves in the $X_1$ direction, the pressing portion 55b presses the spring-like fitting portion 57a of the transporting plate holder 57 as shown in FIG. 11(B), so as to rotate the transporting plate holder 57. Due to the rotation of this transporting plate holder 57, the pressing portion 57b thereof presses out the fitting portion 43f of the transporting plate 43, thereby moving the transporting plate 43 approximately 1 mm in the $X_1$ direction, thus reaching the predetermined transporting position.

Now, in this case, due to the form of the cam 54a of the loading gear 54, the control plate 55 moves in the $X_1$ direction with the loading gear 54 rotating 90°, and then moves in the $X_1$ direction with the loading gear 54 rotating the next 90°, thus returning to the initial position. In other words, the control plate 55 makes one reciprocal movement in the X direction with one 180° rotation of the leading gear 54. Also, the transporting plate holder 57 does not follow the movement of the control plate 55 in the $X_2$ direction, but is held by the force of the transporting plate holder spring 58, and thus the transporting plate 43 is maintained at the predetermined transporting position until the transporting plate 43 is driven again.

Also, once the loading gear 54 begins rotation in the clockwise direction as described above, the driving pin 54b formed on the side of the loading gear 54 opposite to the side on which the cam 54a is formed begins to move in the $X_1$ direction, and thereby the chucking plate 44 begins to move in the $X_1$ direction via the driving pin 54b and fitting groove 44a. Accompanying this motion of the chucking plate 44 in the $X_1$ direction, the clamp arm 73 and the driving plate 72 which were in the chucking disengaging state, opened vertically, perform the chucking operation.

Figure 14B:
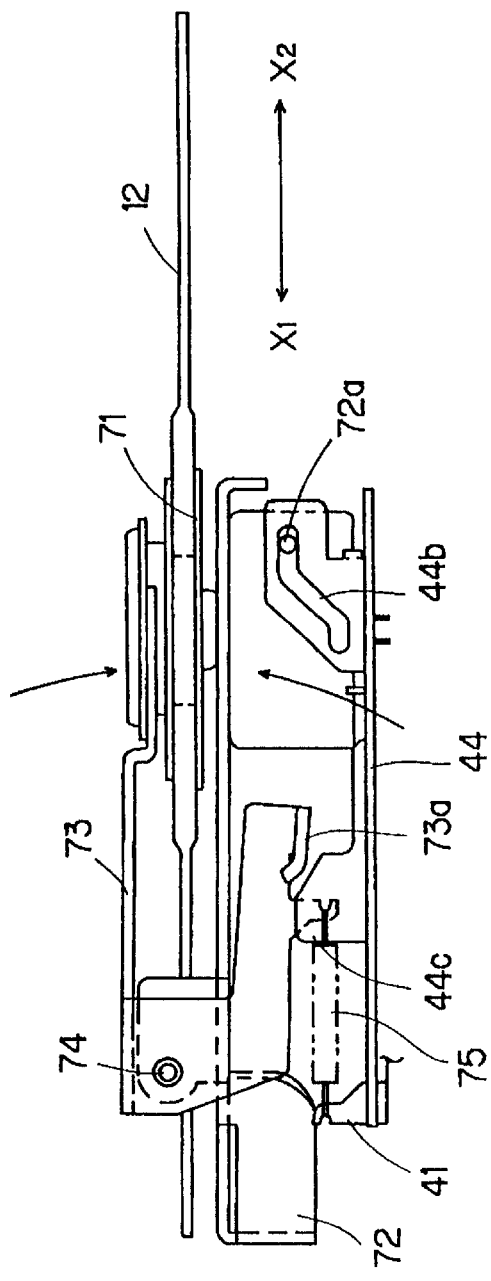
FIG. 14(B) illustrates the chucking state.

In other words, the clamp arm 73 has the contact portion 73a thereof released from the pressing portion 44c of the chucking plate 44, thereby rotating downwards by means of the pressing force of the spring 75, and the driver plate 72 has the pin 72a thereof rise through the cam groove 44b, thereby rotating upwards. As a result, as shown in FIG. 14(B), the chucking of the disk 12 onto the turntable 71 is completed at the point that the leading gear 54 has rotated 180° and the chucking plate 44 has moved f farthest in the $X_1$ direction.

Now, the disk holding member extracted from within the magazine 10 as described above is guided by a pair of guide rails 59 and 60, as shown in FIG. 15. In this case, there is the possibility that there may be slight height offset between the magazine 10 and the loading unit 40 due to the structure of the device, but such height offset is absorbed by the three spring-like pinching portions 59a, 59b, and 60a provided to the guide rails 59 and 60, and the disk holding member 11 is held at a constant height.

Further, the disk holding member 11 is pressed against the positioning portion 59c of the guide rail 59 by means of slight final movement of the transporting plate 43 at the time of the chucking operation, thereby conducting positioning thereof in the X direction. Also, by means of the side of the disk holding member 11 being pressed against the positioning portion 59c of the guide rail 59, positioning thereof in the Y direction is also carried out. Thus, positioning of the disk holding member 11 in the height direction and X/Y directions can be automatically conducted in an excellent manner at the time of transporting the disk holding member 11 by means of a pair of guide rails 59 and 60, thereby enabling chucking operation to be conducted in a desirable manner at an optimal position.

At the point that chucking of the disk 12 has been completed, inverse rotation of the loading motor 47 causes the loading pinion 50, which had rotated in a counter-clockwise direction such as shown in FIG. 10 during the chucking operation, to rotate in a clockwise direction. In this case, the position restricting pin 51 a of the swing plate 51 is situated at the release portion 43e of the cam groove 43c, so the swing plate 51 rotates in a clockwise direction according to the direction of rotation of the loading pinion 50, so as to move to an eject position $P_3$ such as shown in FIG. 17(B), and the swing gear 52 meshes with the tooth 61b of the starter rack 61 at the large diameter gear member.

In this state, rotating the loading pinion 50 further in the clockwise direction causes the starter rack 61 to move in the $X_1$ direction, and the starter link 62 rotates in the clockwise direction via the fitting groove 61a and the pin 62a. As a result, the arm unit 43b of the transporting plate 43 is pressed by the pressing portion 62c of the starter link 62, causing the transporting plate 43 to move somewhat in the $X_2$ direction, and the small diameter gear member of the loading pinion 50 meshes with the edge portion of the rack 43a once more.

Accordingly, subsequently, the transporting plate 43 moves in the $X_2$ direction by means of the clockwise rotation of the loading pinion 50, and the leading end of the arm unit 43b presses out the second fitting portion 11c of the disk holding member 11, thereby returning the disk holding member 11 into the magazine 10.

Also, when the transporting plate 43 begins to move in the $X_2$ direction, the swing plate 51 is returned from the eject position $P_3$ to the idling position $P_1$ once more by means of the cam groove 43c, and thus the swing gear 52 is maintained at a state disengaged from the loading gear. Consequently, the loading gear 54 is held at a stopped state, so the drive unit 70 is held in a chucking state as shown in FIG. 14(B).

In other words, when the disk holding member 11 moves in the $X_2$ direction which is the returning direction to the magazine 10, the disk 12 is chucked on the turntable 71 in a sure manner, so the disk 12 remains on the turntable 71 having been extracted from the disk holding member 11, by means of the holding arm 13 of the disk holding member 11 rotating out of the way. Accordingly, the disk holding member 11 alone is returned into the magazine 10.

In the state of disk loading completion wherein the disk 12 is chucked on the turntable 71 by means of the aforementioned disk loading operation, members such as the transporting plate 43, the swing plate 51, and the swinging gear 52 are at the aforementioned initial state. Conversely, the chucking plate 44 is stopped at a position wherein the loading gear 54 has rotated 180° from the initial position, and thus is held at the position which is farthest in the $X_1$ direction, opposite to the initial position. The drive unit 70 is in a chucking state wherein the lamp arm 73 and the drive plate 72 are closed, as shown in FIG. 14(B).

In order to return the disk 12 chucked on the turntable 71 as shown in FIG. 14 (B) to the magazine 10 when playing has ended, or for some other reason, a disk ejecting operation is performed, this disk ejecting operation comprising a three-step operation of: (4) operation of extracting the disk holding member, (5) operation of disengaging disk chucking, and (6) operation of returning the disk holding member. The details of this disk ejecting operation is as described below.

The operation of extracting the disk holding member 11 when performing the disk ejecting operation is basically the same as the operation of extracting the disk holding member 11 when performing the disk loading operation. In other words, the loading motor 47 shown in FIG. 5(A) is rotated in the predetermined direction, and the loading pinion 50 is rotated in a counter-clockwise direction in the Figure, as shown by the arrow in FIG. 8(B), thereby moving the transporting plate 43 in the $X_1$ direction via the rack 43a, thus extracting the disk holding member 11 from the magazine 10.

Now, what is different with the disk loading operation is that the disk holding member 11 extracted from the magazine 10 is not a disk holding member 11 holding the disk 12, but an empty disk holding member 11, and that the disk 12 on the turntable 71 is inserted into the holding member 11, and thus is stored within the disk holding member 11. In other words, once the holding arm 13 of the holding member 11 is pushed outwards temporarily, the disk 12 is stored within the disk holding member 11 by means of this holding arm 13 and spring 14.

In the chucking disengagement operation following the extracting operation of the disk holding member 11, the loading gear 54 which has been rotated 180°. at the time of the chucking operation is further rotated 180°. so as to return to the initial position and thus perform chucking disengagement operation. Except for this, the basic flow of the operations of the driving block 45 is the same as that at the time of the operation of disk loading.

In other words, when the transporting plate 43 moves in the $X_1$ direction by the predetermined amount, the swing plate 51 rotates in the counter-clockwise direction as shown in FIG. 10, and moves from the idling position $P_1$ to the chucking position $P_2$ Immediately afterwards, the loading pinion 50 reaches the gullet 43d of the transporting plate 43, so the transporting plate 43 stops approximately 1 mm before the predetermined transporting position.

Also, the swing gear 52 meshes with the linkage gear 53 by means of rotation of the swing plate 51, and is linked with the loading gear 54, so the loading gear 54 starts rotation in the clockwise direction by means of the loading pinion 50 rotating in the counter-clockwise direction. In this case, the loading gear 54 is at a position rotated 180° from the initial position as shown in FIG. 13(B), and therefore the loading gear 54 performs an operation of rotating 180° further from this position, thus returning to the initial position. In this case, the control plate 55 returns to the X direction exactly in the same manner of the first half rotation of 180° of the loading gear, owing to the form of the cam 54a of the loading gear 54. In other words, the control plate 55 presses the transporting plate 43 out to the predetermined transporting position via the transporting plate holder 57, and the returns to the initial position.

Conversely, the driving pin 54b of the loading gear 54 and the catching plate 44 fit thereto are at the most direction $X_1$ direction-wise position, as shown in FIG. 13 (B), so the chucking plate 44 moves in the $X_2$ direction accompanying the later half 180° rotation of the loading gear 54, reverse to the first half 180° rotation. As a result, the clamp arm 73 and the drive plate 72 which were in the chucking state as shown in FIG. 14(B), perform chucking disengaging operation.

In other words, the clamp arm 73 has the contact portion 73a thereof fit again to the pressing portion 44c of the chucking plate 44, thereby rotating by being lifted up. Also, the drive plate 72 rotates downwards by means of the pin 72a thereof descending through the cam groove 44b. Consequently, as shown in FIG. 14(A), the loading gear 54 rotates 180° and returns to the initial position, and at the point that the chucking plate 44 has moved to the most $X_1$ direction-wise position, the chucking disengagement of the disk 12 from the turntable 71 is completed.

The operation of guiding the disk holding member during the disk ejecting operation is exactly the same as that during the disk loading operation. In other words, positioning of the disk holding member 11 in the height direction and X/Y directions can be automatically conducted in an excellent manner by means of a pair of guide rails 59 and 60. Thus, at the time of transporting the disk holding member 11, the disk 12 which had been chucked on the turn table 71 can be inserted into this disk holding member 11 at an optimal position, thereby holding the disk 12 within the disk holding member 11 in a sure manner.

The operation of returning the disk holding member 11 during the disk ejecting operation is basically the same as the operation of returning the disk holding member 11 during the aforementioned disk loading operation. In other words, at the point that chucking of the disk 12 has been completed, inverse rotation of the loading motor 47 causes the loading pinion 50 to rotate in a clockwise direction, causing the swing plate 51 to rotate in a clockwise direction, so as to move to an eject position $P_3$ such as shown in FIG. 17(B), and meshes with the tooth 61b of the starter rack 61. In this state, the starter rack 61 moves in the $X_1$ direction due to rotation of the loading pinion 50, and the starter link 62 rotates in the clockwise direction, whereby the transporting plate 43 moves somewhat in the $X_2$ direction, and meshes with the loading pinion 50 once more.

Accordingly, subsequently, the transporting plate 43 moves in the $X_2$ direction by means of the clockwise rotation of the loading pinion 50, thereby returning the disk holding member 11 into the magazine 10.

In this case, the swing plate 51 is returned from the eject position $P_3$ to the idling position $P_1$ once more by means of the cam groove 43c of transporting plate 43, and thus the swing gear 52 is maintained at a state disengaged from the loading gear 54. Consequently, the drive unit 70 is held in a chucking disengagement state as shown in FIG. 14(A).

As described above, when the disk holding member 11 moves in the $X_2$ direction which is the returning direction to the magazine 10, the disk 12 stored in the disk holding member 11 returns into the magazine 10 along with the disk holding member 11, since the disk 12 is released from the drive unit 70.

As described above, according to the present embodiment, in both the disk loading operation and the disk ejecting operation, first, the transporting plate 43 is directly driven via the rack 43a by means of rotation of the loading pinion 50 in the counter-clockwise direction, thereby extracting the disk holding member 11 from the magazine 10 and transporting it to the predetermined transporting position, following which the transporting plate 43 is automatically disengaged by means of the gullet 43e. Then, in this state, the swing gear 52 is linked to the loading gear 54, and the chucking plate 44 is driven to the going path or returning path via the first half or latter half 180° rotation of the loading gear by means of the counter-clockwise rotation of the loading pinion 50, thereby performing chucking of the disk 12 or disengagement thereof according to the direction of motion of this chucking plate 44. Subsequently, the loading pinion 50 is inversely rotated in the clockwise direction, thereby disengaging the loading gear 54 and maintaining the position of the chucking plate 44, and also meshing the loading pinion 50 with the rack 43a once more so as to drive the transporting plate 43 in the reverse direction, thereby returning the disk holding member 11 into the magazine 10.

As described above, according to the present invention, a 1-to-1 corresponding relation is constantly maintained between the rotation direction of the loading pinion 50 which is the output gear and the operating direction of the transporting plate 43 which is the disk holding member transporting means in both the disk loading operation and the disk ejecting operation, and is arranged so that only the operating direction of the chucking plate 44 switches alternately each time the loading gear 54 rotates 180°, as to the loading pinion 50 rotating in the same direction.

In other words, according to the present embodiment, while the transporting plate 43 is caused to make one reciprocal movement to perform extracting/returning operation of the disk holding member 11, the chucking plate 44 can be driven on the going path or the returning path to perform chucking operation of chucking disengagement operation. Accordingly, the transporting plate 43 is caused to carry out the same reciprocal movement at all times by means of a certain rotation control of causing the loading pinion 50 to rotate in the first direction by a certain amount and then causing the loading pinion 50 to rotate in the second direction by a certain amount, and further, the chucking plate 44 can be caused to alternately perform chucking operation and chucking disengagement operation.

In the event of removing the magazine 10 from the base plate 21 in the event of replacing disks 12 or so forth, the shift link 24 is rotated to the end portion of the rotation range thereof, by means of rotation of the shift motor 22 shown in FIG. 1. Consequently, as shown in FIG. 3(B), the shift plate 25 moves to the farthest end in the $X_2$ direction within the movement range thereof, presses the fitting portion 30b of the magazine locking plate 25, thus moving the magazine locking plate 25 in the $X_2$ direction. Thus, the lock shaft 30a is released from the fitting groove 10d provided to the base surface 10c of the magazine 10, the eject plate 29 moves in the $Y_2$ direction by means of the force of the spring 31, ejecting the magazine 10. In this case, the operation speed of the ejecting plate 29 is inhibited by the damper unit 33, so the shock generated between the ejecting plate 29 and the magazine 10 can be sufficiently inhibited, thus ejecting the magazine 10 in a desirable manner.

As described above, according to the present invention, a 1-to-1 corresponding relation can be constantly maintained between the rotation direction of the loading pinion 50 which is the output gear and the operating direction of the transporting plate 43 which is the disk holding member transporting means in both the disk loading operation and the disk ejecting operation. Accordingly, control is easy, and even in the event that the power is turned off the operation being performed before power outage can be resumed, thus facilitating securing of continuity of control.

Particularly, according to the present embodiment, the transporting plate 43 is caused to carry out the same reciprocal movement at all times by means of a certain rotation control of causing the loading pinion 50 to rotate in the first direction by a certain amount and then causing it to rotate in the second direction by a certain amount, and further, the chucking plate 44 is caused to alternately perform chucking operation and chucking disengagement operation, thereby enabling alternately performing disk loading operation and disk ejecting operation. In other words, control is further simplified, since disk loading operation and disk ejecting operation can be alternately performed by means of the same rotation control of the loading pinion 50.

Also, as can be clearly understood from FIG. 5, etc., the dimensions of each member comprising the driving block 45, particularly the gears, are sufficiently small, and even taking operation space into consideration, this does not effect the dimensions of the lading unit 40. Also, the number of parts comprising the driving block 45 is few, and the configuration is simplified. Accordingly, the overall device can be reduced in size and complexity due to such a small and simplified structure of the driving block 45, and the operational reliability thereof is also excellent.

On the other hand, regarding the present embodiment, the magazine is constructed so as to be detachably provided to the device proper, and thus is advantageous in that replacement of the disks 12 can be easily performed by removing the magazine 10 from the device. Further, it is possible to use a magazine 10 which is separate from this magazine 10, this magazine 10 having a plurality of disks 12 stored therein beforehand, and in such a case, a plurality of disks 12 can be changed all at once simply by replacing the magazine 10.

Figure 18:
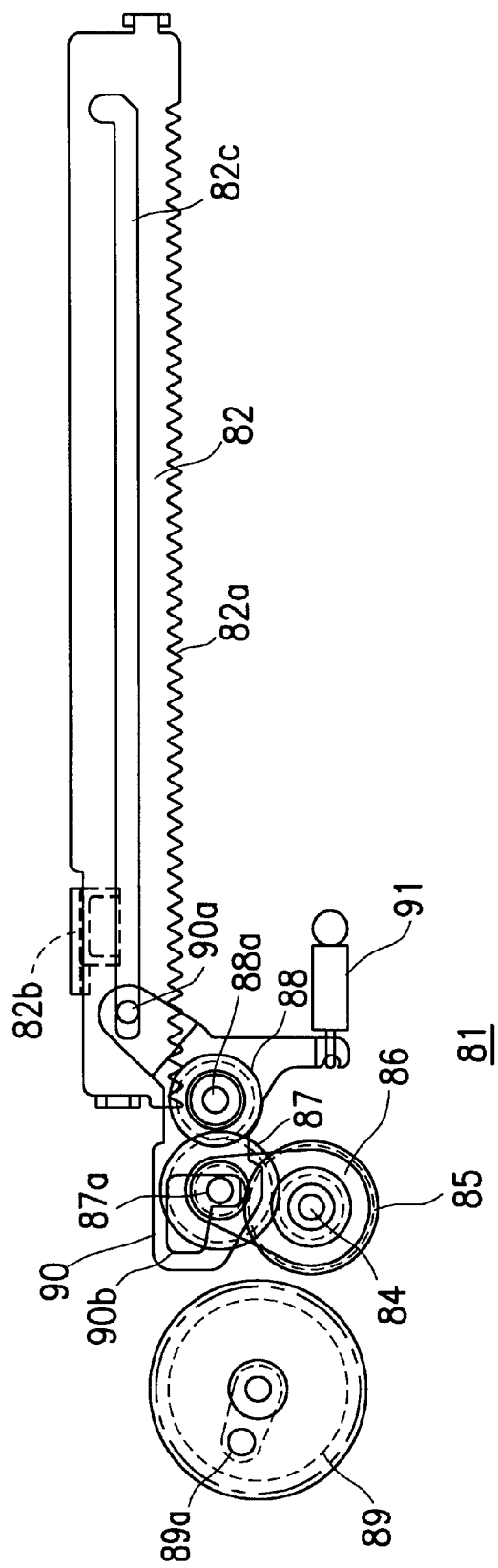
FIG. 18 is a side view illustrating the gear mechanism 81 of the disk changer device relating to the second embodiment according to the present invention, in the initial state.

FIG. 18 through FIG. 24 are side views progressively illustrating different operation states of the gear mechanism 81 of the disk changer device relating to the second embodiment according to the present invention, with FIG. 18 shown in the initial state. As shown in FIG. 18, the gear mechanism according to the present embodiment is a simplified from of the driving force transferring system (selecting mechanism) of the loading unit in the above-described first embodiment. Also, with the present embodiment, as shown in FIG. 25 and FIG. 26, the forms of the transporting plate 82 which is driven by the gear mechanism 81 and the chucking plate 83 likewise, are changed somewhat.

Figure 25A:
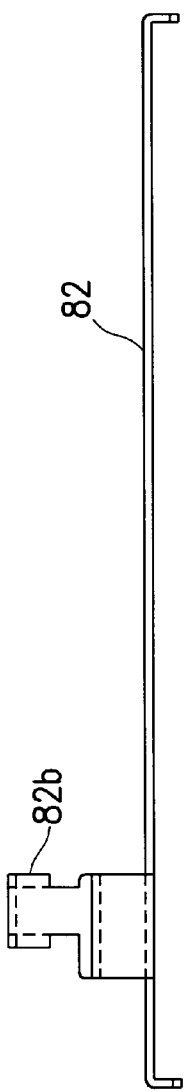
FIG. 25 is a diagram illustrating the transporting plate 82 driven by the gear mechanism 81 shown in FIG. 18, with FIG. 25(A) being a plan view and FIG. 25(B) being a side view.
Figure 25B:
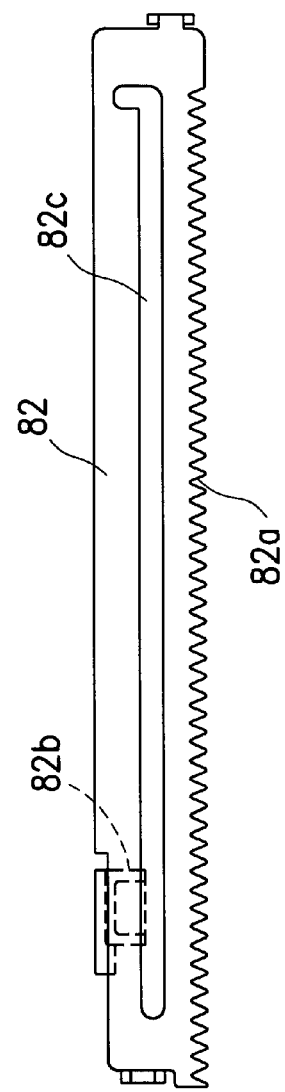
Figure 26A:
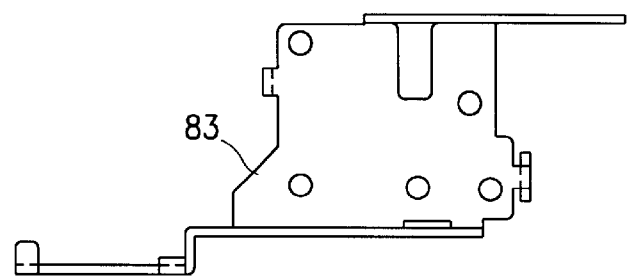
FIG. 26 is a diagram illustrating the chucking plate 83 driven by the gear mechanism 81 shown in FIG. 18, with FIG. 26(A) being a side view, FIG. 26(B) being a plan view, and FIG. 26(C) being a side view illustrating only the side wall having the cam groove 83b.
Figure 26B:
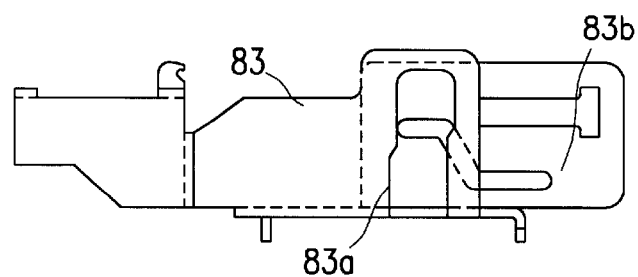
Figure 26C:
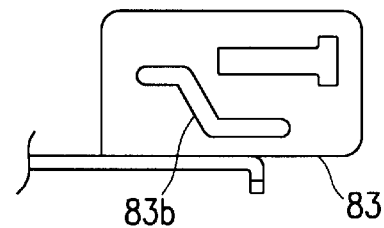

In other words, as shown in FIG. 25(A) and FIG. 25(B), the transporting plate 82 is provided with a rack 82a which does not have a gulleted portion, an arm unit 82b which fits with the disk holding member, and an L-shaped cam groove 82c extending in the X direction. Also, as shown in FIG. 26(A) and FIG. 26(B), a fitting groove 83a for fitting with a later-described loading gear 89 of the gear mechanism 81 is provided to one wall of the chucking plate 83. Also, as shown in FIG. 26(C), a cam groove 83b is provided to the other wall of the chucking plate 83 for driving a drive unit 70 such as illustrated in FIG. 14 and performing chucking/chucking disengagement. Further, in this case, the form of the cam groove 83b is arranged so as to cause the drive unit to perform chucking operation by moving from the position at the direction $X_1$ in the Figure of the chucking plate to the direction $X_2$ in the Figure. The following is a detailed description of the construction of the gear mechanism 81.

As shown in FIG. 18, the gear mechanism 81 is comprised of a pinion shaft 84, loading pinion 85, swing plate 86, swing gear 87, linkage gear 88, loading gear 89, lock plate 90, etc.

First, the pinion shaft 84 is attached to a main wall or the like of the motor bracket as shown in FIG. 5, and a loading pinion (output gear) 85 is provided to this pinion shaft 84. This loading pinion 85 is constructed from a large diameter gear member and a small diameter gear member, being linked to a loading motor (driving source) 47 such as shown in FIG. 5 via a worm mechanism 48 or the like such as shown in FIG. 19 through FIG. 25 by means of the outer diameter gear member, and also is perpetually meshed with a later-described swing gear 87 by means of the small diameter gear member.

Figure 20:
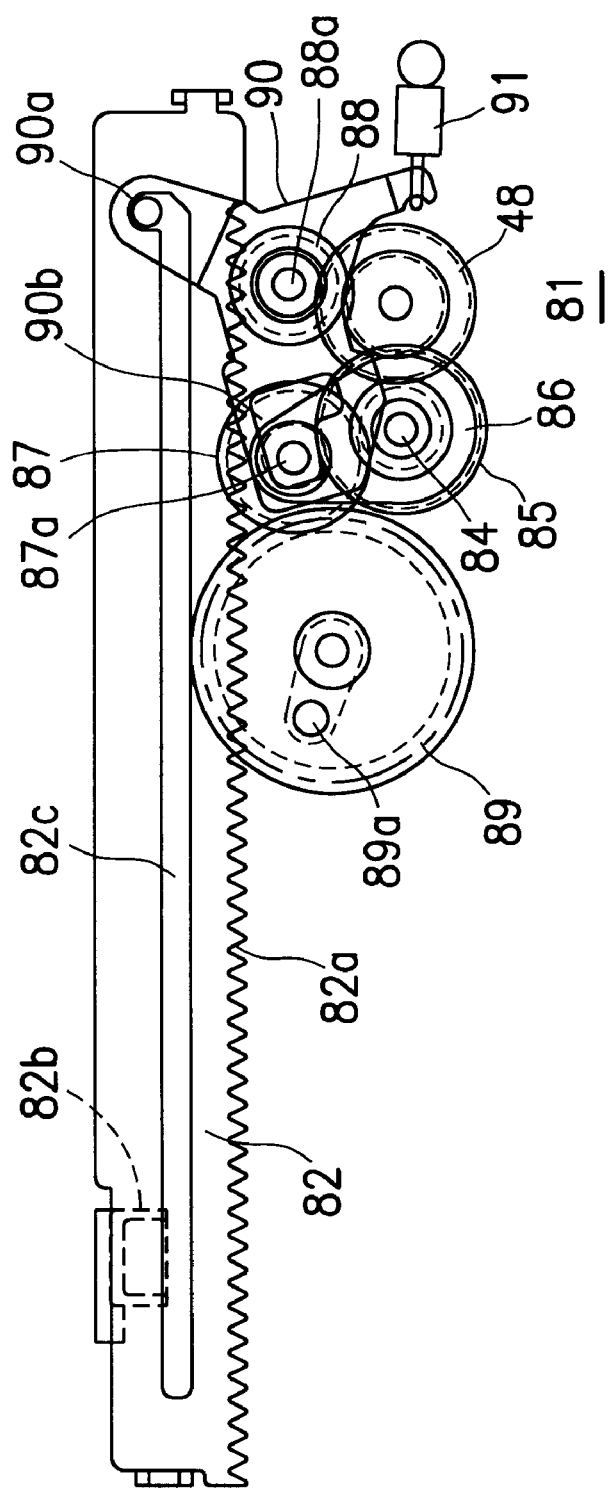
FIG. 20 is a diagram illustrating the gear mechanism 81 shown in FIG. 18, showing a side view of a state wherein the swing gear 87 of the gear mechanism 81 has rotated from the state shown in FIG. 19 and transfer of the output has been switched.

The pinion shaft 85 is provided with a swing plate 86 so as to press against the loading pinion 85, and rotated in the rotation direction of the loading pinion 85. A swing gear 87 is provided to the rotational free end of this swing plate 86, and a linkage gear 88 and loading gear 89 are positioned in an opposing manner with this swing gear 87 between. Now, the swing gear 87 perpetually meshes with the loading pinion 85 and selectively meshes with the linkage gear 88 and loading gear 89 according to the rotational position. In other words, the swing gear 87 is arranged such that in the event that the swing gear 87 has rotated in the clockwise direction in the Figure, it is meshed with the linkage gear 88 in the first rotational position as shown in FIG. 18, and in the event that the swing gear 87 has rotated in the counter-clockwise direction in the Figure, it is meshed with the loading gear 89 in the second rotational position as shown in FIG. 20.

Figure 21:
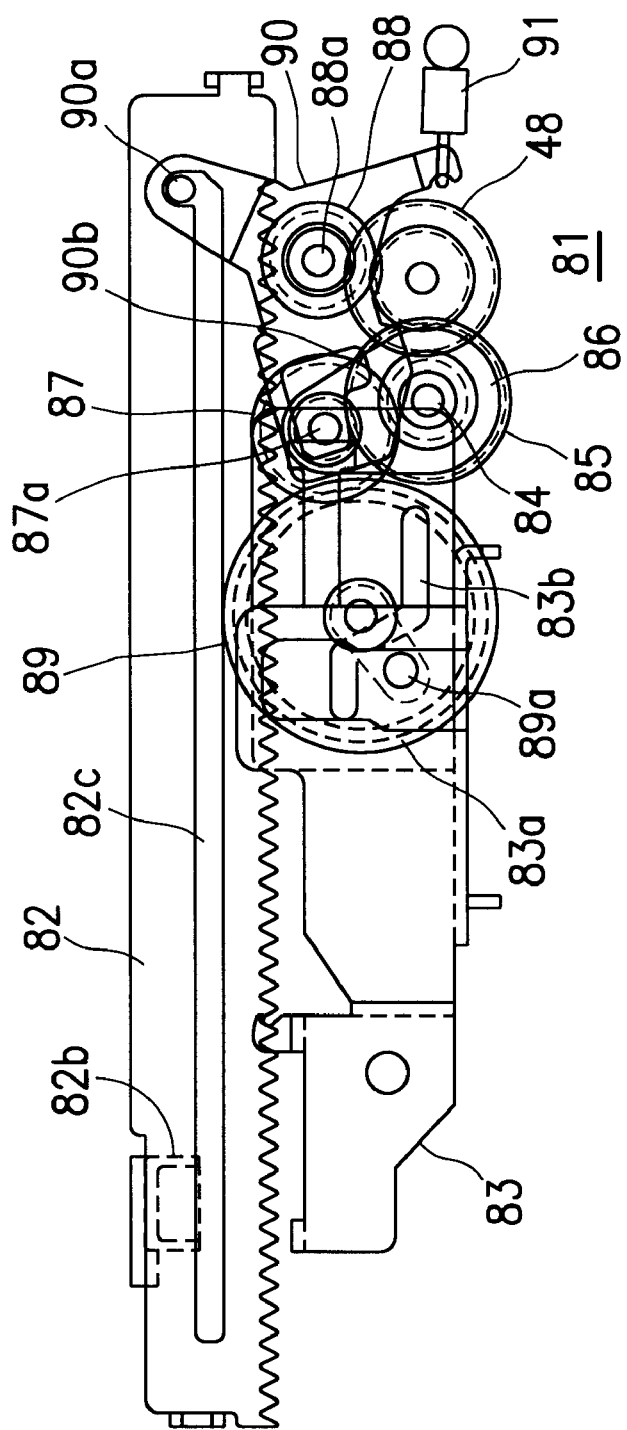
FIG. 21 is a diagram illustrating the gear mechanism 81 shown in FIG. 18, showing a side view of a state wherein the loading gear 89 of the gear mechanism 81 has started driving of the chucking plate 83 from the state shown in FIG. 20.

Of these, the linkage gear 88 is perpetually meshed with the rack 82a of the transporting plate 82, and is arranged so as to drive the transporting plate 82 in the X direction in the Figure by means of meshing with the swing gear 87 and rotating. Now, as with the case of the earlier embodiment, $X_1$ and $X_2$ each indicate the extracting direction of the disk and the returning direction thereof. Also, the loading gear (chucking driving gear) 89 has a driving pin 89a for driving the chucking plate 83. This driving pin 89a is inserted into the fitting groove 83a of the chucking plate 83, as shown in FIG. 21, thus driving the chucking plate 83 in the X direction according to the rotation of the loading gear 89, so as to cause the chucking plate 83 to make one reciprocal movement while the loading gear 89 makes one rotation. Also, in this case, the width dimensions in the X direction of the fitting groove 82a of the chucking plate 83 is set at around twice the diameter of the driving pin 89a, thereby the driving pin 89a driving the chucking plate 83 only at the central portion of the end position of the $X_1$ direction to the end position of the $X_2$ direction, being arranged so as to release the chucking plate 83 near each end position.

Figure 27:
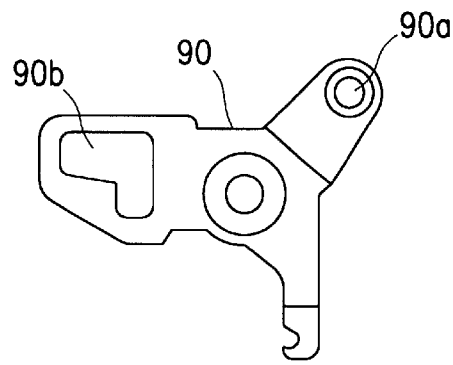
FIG. 27 is a plan view illustrating the lock plate 90 of the gear mechanism 81 shown in FIG. 18.
Figure 28:
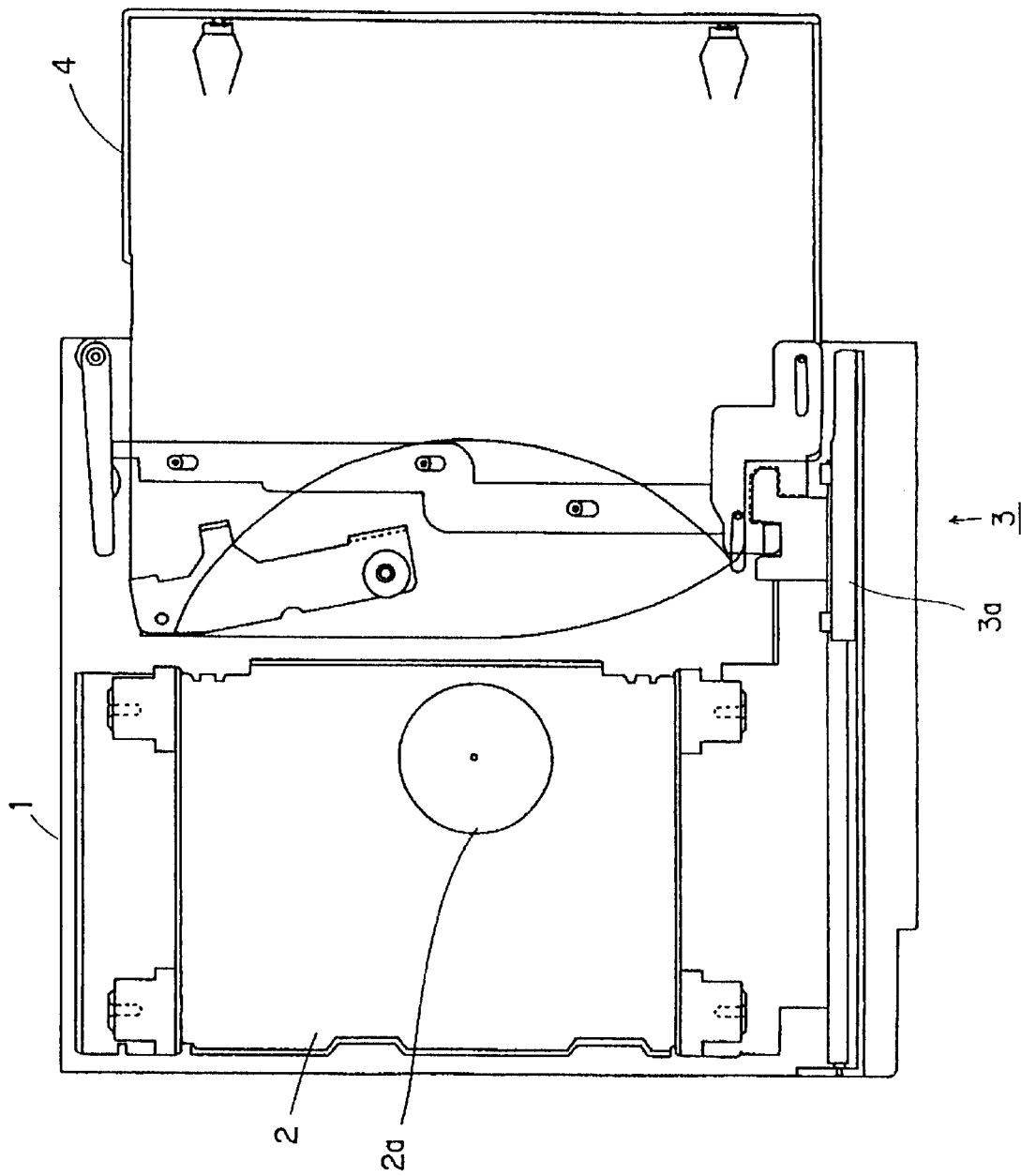
FIG. 28 is a plan view illustrating an example of a conventional disk changer device.
Figure 29:
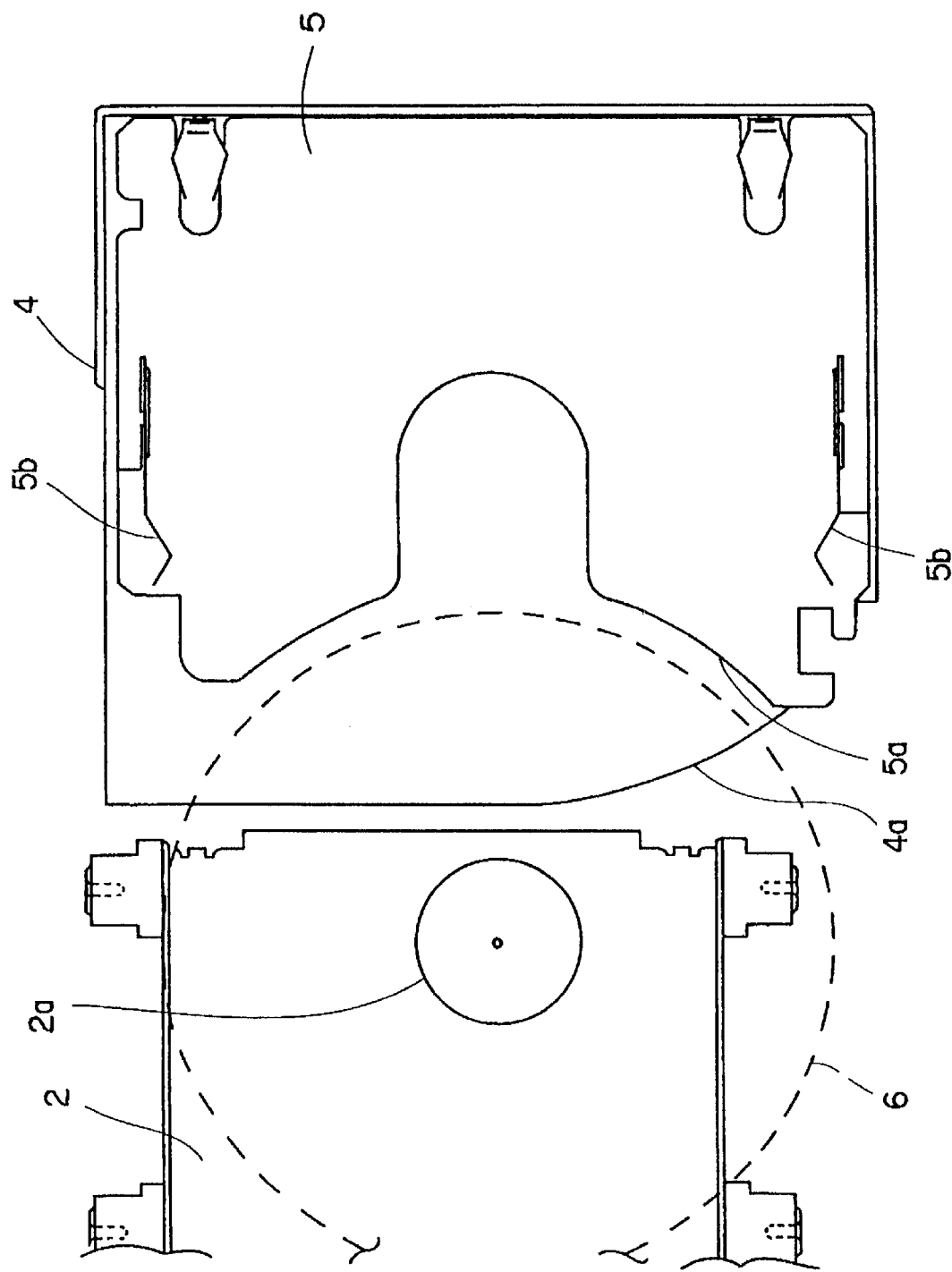
FIG. 29 is a plan view illustrating the positional relation between the turntable and the disk holding member of the disk changer device shown in FIG. 28.
Figure 30:
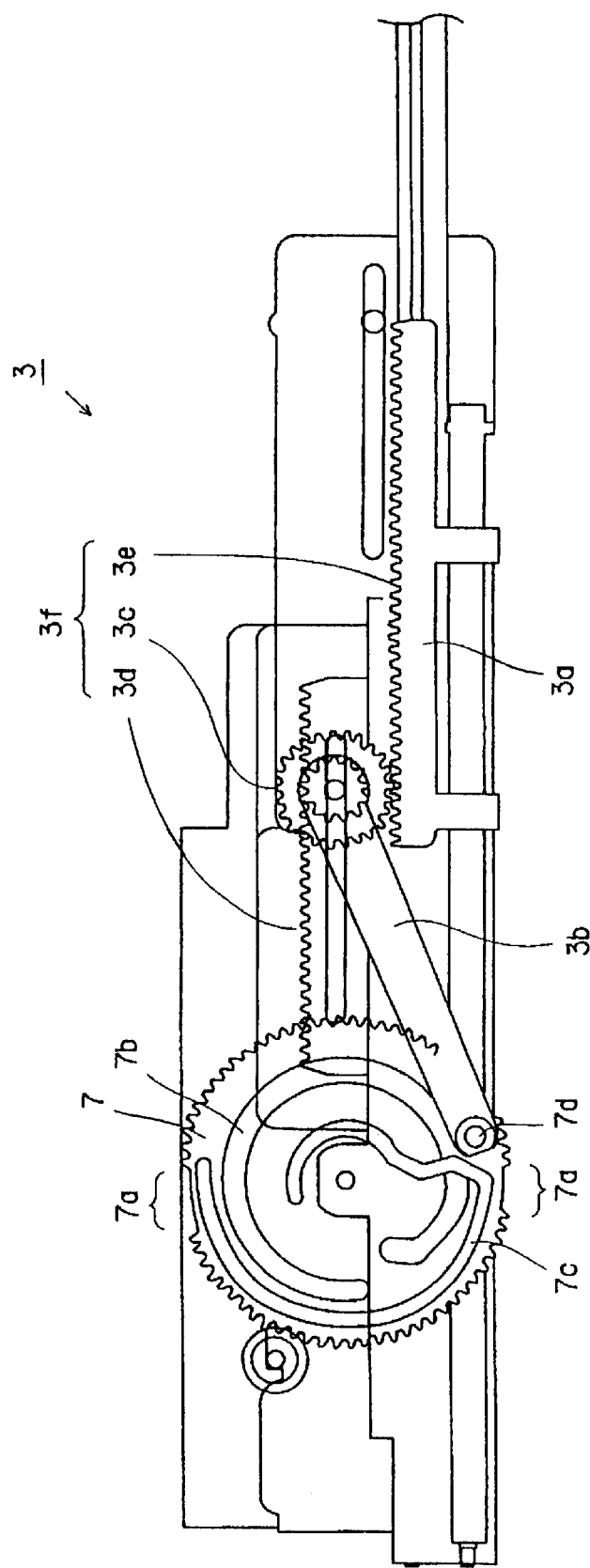
FIG. 30 is a side view illustrating the driving construction of the transporting/chucking mechanism of the disk changer device shown in FIG. 28.

On the other hand, as shown in FIG. 18, the lock plate 90 is rotatably provided to the shaft 88a of the linkage gear 88. As shown in FIG. 27, a position restricting pin 90a is provided to one rotational free end of this lock plate 90, so as to be inserted into the cam groove 82 of the transporting plate 82 and restrict the rotational position of the lock plate 90. Also, provided to the other rotational free end of this lock plate 90 is an L-shaped lock groove 90b formed of a side portion and a narrow portion, with a locked pin 87a equivalent to the shaft of the swing gear 87 being inserted into this lock groove 90b.

Figure 19:
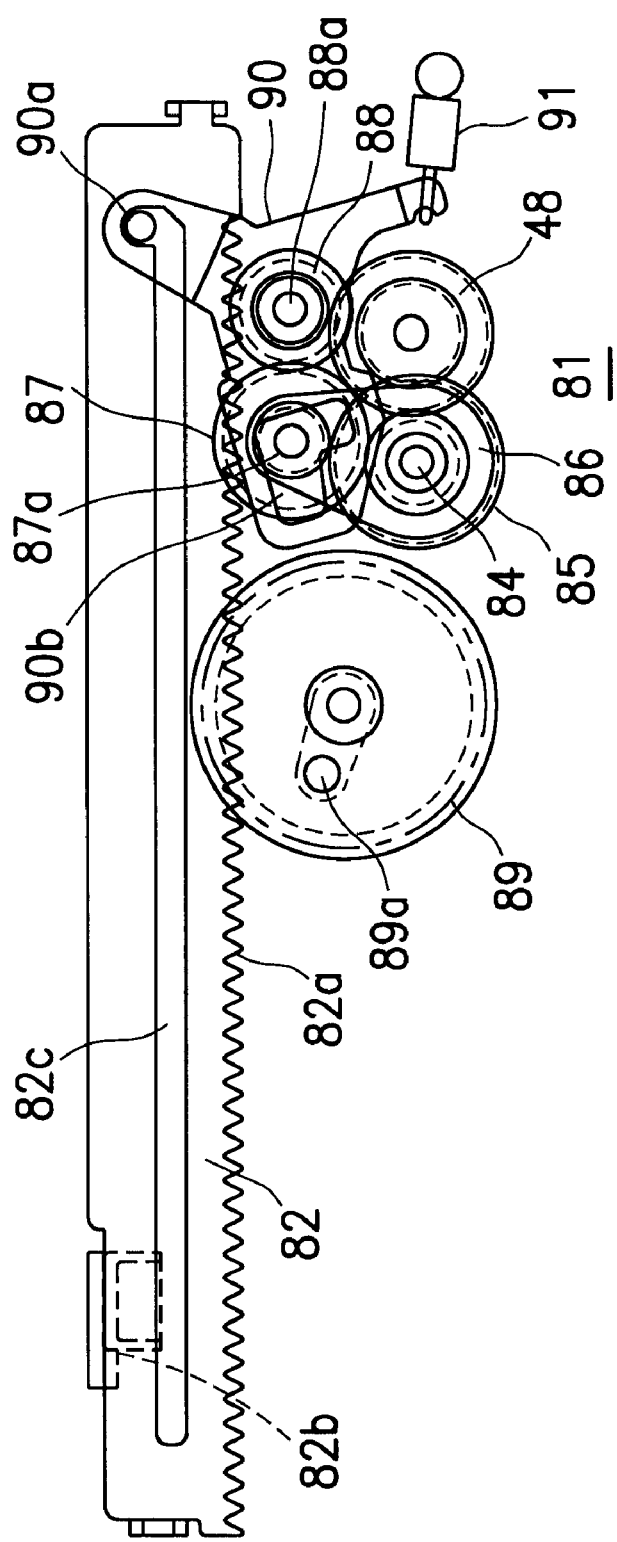
FIG. 19 is a diagram illustrating the gear mechanism 81 shown in FIG. 18, showing a side view of a state wherein the transporting plate 82 of the gear mechanism 81 has moved in the $X_1$ direction from the state shown in FIG. 18 by a certain amount, enabling rotation of the swing gear 87.

In other words, as shown in FIG. 18, the lock plate 90 is held at the clockwise direction locking position in the Figure by means of position restricting of the position restricting pin 90a by the long narrow-width portion of the cam groove 82c when the transporting plate 82 is moving in the X direction, and as shown in FIG. 19, the position restricting pin 90a can be moved to the counter-clockwise direction disengaging position in the Figure by means of the short wide-width portion of the cam groove 82c when transporting of the transporting plate 82 is completed. When the lock plate 90 is at a locking position as shown in FIG. 18, the lock plate 90 locks the locked pin 87a of the swing gear 87, thereby locking the swing gear 87 to the first rotational position (a position meshing with the linkage gear 88) by means of the narrow-width portion of the lock groove 90b. Also, at the disengaging position as shown in FIG. 19, the lock plate 90 releases the locked pin 87a of the swing gear 87, thus enabling the swing gear 87 to move to the second rotational position (a position meshing with the loading gear 89) by means of the wide-width portion of the lock groove 90b. In this case, the lock plate 90 is pressed to the release position side which is the counter-clockwise direction in the Figure, by means of a spring 91 provided between the lock plate 90 and the chassis 41, as shown in FIG. 5.

Also, according to the present embodiment, the transporting plate 82 and the linkage gear 88 are perpetually meshed, and a gullet is not provided to the rack 82a of the transporting plate 82, so there is no provision of members for performing moving or holding of the transporting plate 82 following disengagement by gulleting, nor is there provision of members for remeshing with the driving side. In other words, members used in the first embodiment such as the control plate 55 and transporting plate holder 57, or starter rack 61 and starter link 62, etc. are omitted in the present embodiment.

Also, the units other than the loading unit 40, in other words, the magazine 10 and base unit 20, and the drive unit 70 and so forth are constructed exactly the same as the first embodiment.

According to the present embodiment having a construction as described above, disk loading operation and disk ejecting operation can be conducted in a desirable manner. Also, the same as with the first embodiment, there is also a high degree of commonly shared items in the disk loading operation and the disk ejecting operation. The following is separate descriptions of the details of each operation and the initial state before operation, and the commonness between the disk loading operation and the disk ejecting operation.

In the initial state before disk loading, as shown in FIG. 18, the transporting plate 82 is at the most $X_2$ direction-wise position, and the rack 82a thereof is meshed with the linkage gear 88 at the end in the $X_1$ direction. Also, the position restricting pin 90a of the lock plate 90 is at the end of the cam groove 82c of the transporting plate 82 in the $X_1$ direction, the lock plate 90 being restricted at the locking position. Accordingly, the locked pin 87a of the swing gear 87 is situated at the narrow-width portion of the lock groove 90b, the swing gear 87 being restricted to the first rotational position, and engaged with the linkage gear 88. Also, since the driving pin 89a of the loading gear 89 is in the position to the $X_1$ direction in the Figure, a chucking plate 83 which is not shown in this FIG. 18 is also at the $X_1$ direction position, and the drive unit 70 is at a chucking disengaging state such as shown in FIG. 14(A).

In order to play disks from the above-described initial state, a disk holding member 11 such as illustrated in FIG. 2 is selected by procedures such as described with the above-described first embodiment, and then and then a disk loading operation is performed, this disk loading operation comprising a three-step operation of: (1) operation of extracting the disk holding member; (2) operation of chucking the disk; and (3) operation of returning the disk holding member. The details of the disk loading operation are as described below.

First, the loading motor 47 shown in FIG. 5 is rotated, causing the loading pinion 85 to be rotated in a counter-clockwise direction in the Figure, as shown by an arrow in FIG. 18. Along with this rotation of the loading pinion 85, the transporting plate 82 moves in the $X_1$ direction via the swing gear 87, linkage gear 88, and rack 82a, and the leading end of the arm unit 82b presses out the disk holding member 11 shown in FIG. 2, thus extracting the disk holding member 11 holding the disk 12 from the magazine 10.

When the transporting plate 82 moves in the $X_1$ direction by a predetermined amount, the position restricting pin 90a of the lock plate 90 reaches the wide-width portion of the cam groove 82c and becomes rotatable, as shown in FIG. 19, so the lock plate 90 rotates to the release position by means of the force of the spring 91. Consequently, the locked pin 87a of the swing gear 87 reaches the wide-width portion of the lock groove 90b and becomes rotatable, so the swing gear 87 rotates in a counter-clockwise direction according to the rotational direction of the loading pinion 85 and is disengaged from the linkage gear 88, and as shown in FIG. 20, meshes with the loading gear 89 at the second rotational position. Accordingly, subsequently, accompanying the rotation to the counter-clockwise direction in the Figure of the loading pinion 85 in the Figure, the loading gear 89 begins rotating in the counter-clockwise direction in the Figure, via the swing gear 87.

Figure 22:
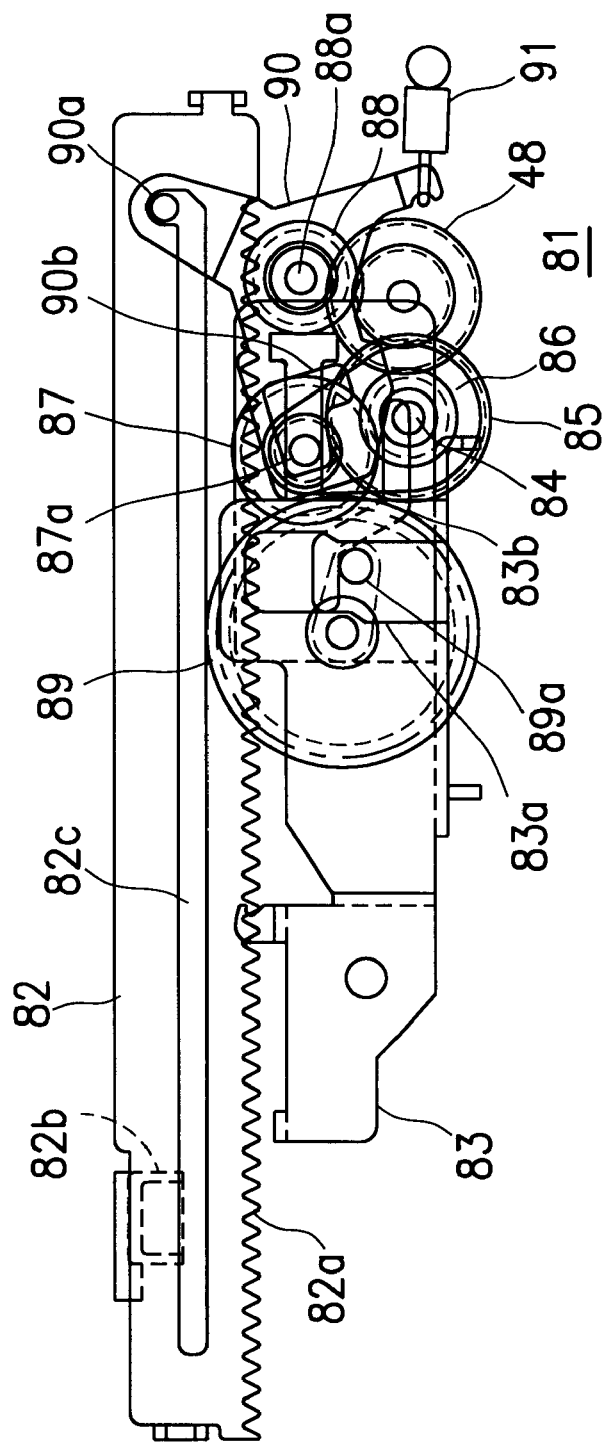
FIG. 22 is a diagram illustrating the gear mechanism 81 shown in FIG. 18, showing a side view of a chucking state wherein the loading gear 89 of the gear mechanism 81 has completed driving of the chucking plate 83 from the state shown in FIG. 21.

Then, once the loading gear 89 starts counter-clockwise rotation as described above, the driving pin 89a which was situated at the $X_1$ direction position at the initial state begins movement to the $X_2$ direction, as shown in FIG. 21, and thus the chucking plate 83 begins movement to the $X_2$ direction, via the driving pin 89a and the fitting groove 83a. In this case, the width dimensions of the fitting groove 83a is set at around twice the diameter of the driving pin 89a, thereby the driving pin 89a efficiently driving the chucking plate 83 only at the central portion of the end position of the $X_1$ direction to the end position of the $X_2$ direction. In other words, at the fastest portion in the X direction, being arranged so as to release the chucking plate 83 near each end position. Accompanying the movement of the chucking plate 83 in the $X_2$ direction, the drive unit 70 is driven following the cam groove 83b thereof as shown in FIG. 14, thus performing chucking operation. In other words, the process shifts from the chucking disengagement state shown in FIG. 14(A) to the chucking state shown in FIG. 14(B). The details of the chucking operation of the drive unit 70 at this time are the same as those of the first embodiment, and description thereof will be omitted here. Also, FIG. 22 illustrates the state of the gear mechanism 41 at the time of chucking.

Figure 23:
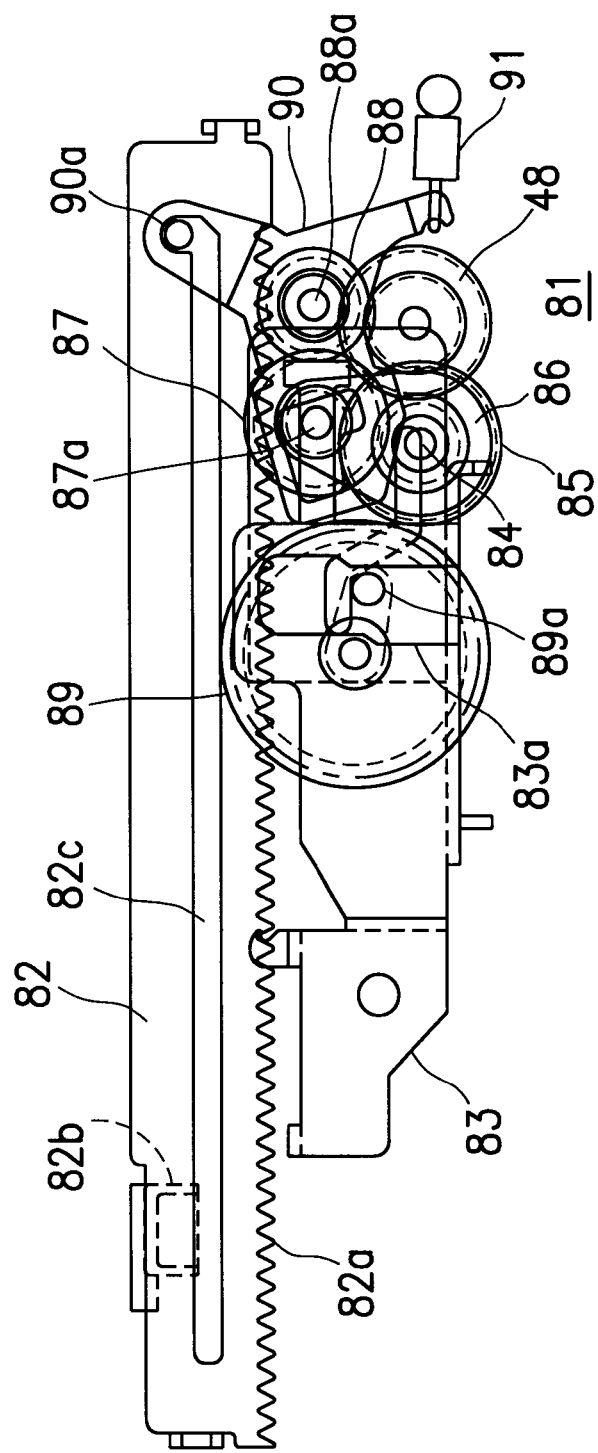
FIG. 23 is a diagram illustrating the gear mechanism 81 shown in FIG. 18, showing a side view of a state wherein the swing gear 87 of the gear mechanism 81 has rotated from the state shown in FIG. 22 and transfer of the output has been switched.
Figure 24:
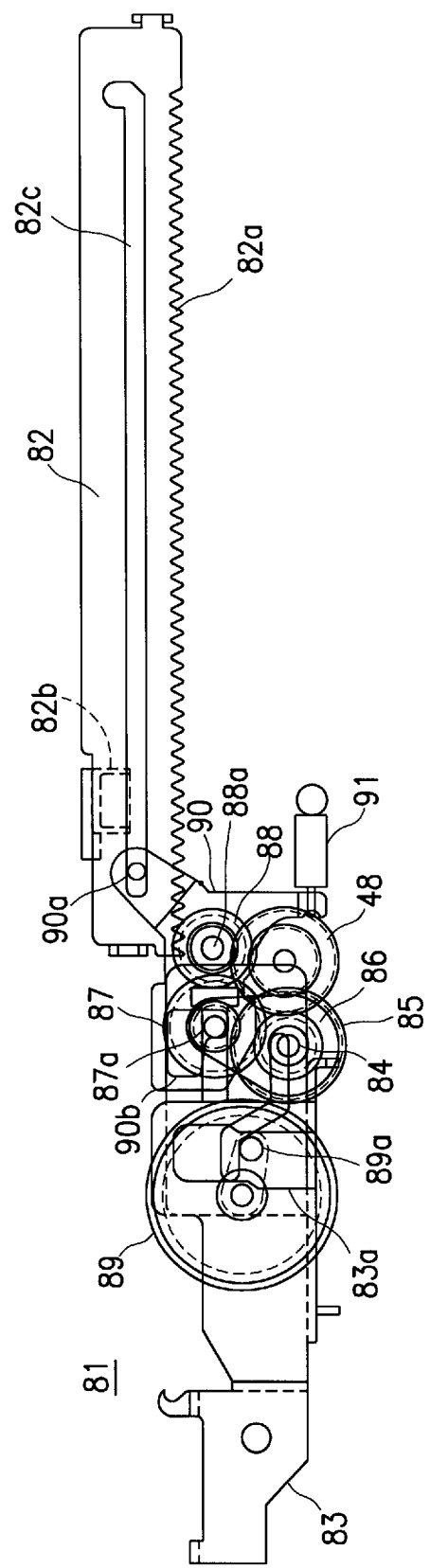
FIG. 24 is a diagram illustrating the gear mechanism 81 shown in FIG. 18, showing a side view of a state wherein the transporting plate 82 of the gear mechanism 81 has moved in the $X_2$ direction from the state shown in FIG. 23 by a certain amount.

At the point that chucking of the disk 12 has been completed, inverse rotation of the loading motor 47 shown in FIG. 5 causes the loading pinion 85, which had rotated in a counter-clockwise direction such as shown in FIG. 18 during the chucking operation, to rotate in a clockwise direction. In this case, the lock plate 90 is at the disengagement position, and the locked pin 87a of the swing gear 87 is situated at the wide-width portion of the lock groove 90b of the lock plate 90, so the swing gear 87 rotates in a clockwise direction according to the direction of rotation of the loading pinion 85, so as to mesh with the linkage gear 88 at the first rotational position as shown in FIG. 23.

Accordingly, subsequently, the transporting plate 82 moves in the $X_2$ direction by means of the clockwise rotation of the loading pinion 85, and the leading end of the arm unit 82b presses out the second fitting portion 11c of the disk holding member 11 shown in FIG. 2, thereby returning the disk holding member 11 into the magazine 10.

Also, when the transporting plate 82 begins to move in the $X_2$ direction, the lock plate 90 is returned from the release position to the lock position once more by means of the cam groove 82c, and thus the swing gear 87 is disengaged from the loading gear 89 and held at a first rotational position meshed with the linkage gear 88. Consequently, the loading gear 89 is held at a stopped state, so the drive unit 70 is held in a chucking state as shown in FIG. 14(B). Accordingly, as with the aforementioned first embodiment, when the disk holding member 11 moves in the $X_2$ direction which is the returning direction to the magazine 10, the disk 12 is chucked on the turntable 71 in a sure manner, the disk holding member 11 alone is returned into the magazine 10.

In the state of disk loading completion wherein the disk 12 is chucked on the turntable 71 by means of the aforementioned disk loading operation, members such as the transporting plate 82, the swing plate 86, the swing gear 87, and lock plate 90 are at the aforementioned initial state. Conversely, the chucking plate 83 is stopped at a position wherein the loading gear 89 has rotated half of a rotation from the initial position, and the driving pin 89a is held at the position in the $X_2$ direction which is opposite to the initial position. The drive unit 70 is in a chucking state wherein the lamp arm 73 and the drive plate 72 are closed, as shown in FIG. 14.

In order to return the disk 12 chucked on the turntable 71 as shown in FIG. 14 (B), a disk ejecting operation is performed, this disk ejecting operation comprising a three-step operation of: (4) operation of extracting the disk holding member, (5) operation of disengaging disk chucking, and (6) operation of returning the disk holding member. The details of this disk ejecting operation is as described below.

The operation of extracting the disk holding member 11 when performing the disk ejecting operation is basically the same as the operation of extracting the disk holding member 11 when performing the disk loading operation. The only thing that is different with the disk loading operation is that the disk holding member 11 extracted from the magazine 10 is not a disk holding member 11 holding the disk 12, but an empty disk holding member 11, and that the disk 12 on the turntable 71 is inserted into the holding member 11, and thus is stored within the disk holding member 11.

In the chucking disengagement operation following the above-described extracting operation of the disk holding member 11, the loading gear 89 which has been rotated half a rotation at the time of the chucking operation is further rotated half a rotation so as to return to the initial position and thus perform chucking disengagement operation. Except for this, the basic flow of the operations of the gear mechanism 41 is the same as that at the time of the operation of disk loading.

In other words, when the transporting plate 82 moves in the $X_1$ direction by the predetermined amount, the lock plate 90 rotates to the disengagement position as shown in FIG. 19, and the locked pin 87a of the swing gear 87 becomes rotatable so the swing gear 87 rotates in a counter-clockwise direction according to the rotation of the loading pinion 85 and is disengaged from the linkage gear 88, 1 and as shown in FIG. 20, meshes with the loading gear 89 in the second rotating position. Accordingly, subsequently, accompanying the rotation to the counter-clockwise direction in the Figure of the loading pinion 85 in the Figure, the loading gear 89 begins rotating in the counter-clockwise direction in the Figure, via the swing gear 87.

Then, once the loading gear 89 starts counter-clockwise rotation as described above, the driving pin 89a which was situated at the $X_2$ direction position at the initial state begins movement to the $X_1$ direction, and thus the chucking plate 83 begins movement to the $X_1$ direction, via the driving pin 89a and the fitting groove 93a. In this case, the driving pin 89a efficiently drives the chucking plate 83 only at the central portion of the end position of the $X_1$ direction to the end position of the $X_2$ direction, in other words, at the fastest portion in the X direction, being arranged so as to release the chucking plate 83 near each end position. Accompanying the movement of the chucking plate 83 in the $X_2$ direction, the drive unit 70 is driven following the cam groove 83b thereof as shown in FIG. 14, thus performing chucking disengaging operation. In other words, the process shifts from the chucking state shown in FIG. 14 (B) to the chucking disengagement state shown in FIG. 14(A). The details of the chucking disengagement operation of the drive unit 70 at this time are the same as those of the first embodiment, and description thereof will be omitted here.

The returning operation of the disk holding member 11 when performing the disk ejecting operation is basically the same as the returning operation of the disk holding member 11 when performing the disk loading operation. In other words, at the point that chucking disengagement of the disk 12 has been completed, inverse rotation of the loading motor 47 shown in FIG. 5 causes the loading pinion 85, which had rotated in a counter-clockwise direction during the chucking operation, to rotate in a clockwise direction. In this case, the lock plate 90 is at the disengagement position, and the locked pin 87a of the swing gear 87 is situated at the wide-width portion of the lock groove 90b of the lock plate 90, so the swing gear 87 rotates in a clockwise direction according to the direction of rotation of the loading pinion 85, so as to mesh with the linkage gear 88 at the first rotational position.

Accordingly, subsequently, the transporting plate 82 moves in the $X_2$ direction by means of the clockwise rotation of the loading pinion 85, and the leading end of the arm unit 82b presses out the second fitting portion 11 c of the disk holding member 11 shown in FIG. 2, thereby returning the disk holding member 11 into the magazine 10.

In this case, the lock plate 90 is returned from the release position to the lock position once more by means of the cam groove, and thus the swing gear 87 is disengaged from the loading gear 89 and held at a first rotational position meshed with the linkage gear 88. Consequently, the loading gear 89 is held at a stopped state, so the drive unit 70 is held in a chucking disengagement state as shown in FIG. 14(A). Accordingly, as with the aforementioned first embodiment, when the disk holding member 11 moves in the $X_2$ direction which is the returning direction to the magazine 10, the disk 12 is released from the drive unit 70, and is returned into the magazine 10 with the disk holding member 11.

As described above, according to the present embodiment, in both the disk loading operation and the disk ejecting operation, first, starting with an initial state of the swing gear 87 being meshed with the linkage gear 88 by means of the lock plate 90, the transporting plate 82 is directly driven via the swing gear 87, linkage gear 88, and rack 82a by means of rotation of the loading pinion 85 in the counter-clockwise direction, thereby extracting the disk holding member 11 from the magazine 10 and transporting it to the predetermined transporting position. Then, in this predetermined transporting position, the lock plate 90 is disengaged so as to disengage the swing gear 87 from the linkage gear 88 and mesh it with the loading gear 89, and the chucking plate 83 is driven to the going path or returning path using part of the first half or latter half half-rotation of the loading gear 89 by means of the counter-clockwise rotation of the loading pinion 85, thereby performing chucking of the disk 12 or disengagement thereof according to the direction of motion of this chucking plate 83. Subsequently, the loading pinion 85 is inversely rotated in the clockwise direction, thereby disengaging the loading gear 89 and maintaining the position of the chucking plate 83, and also meshing the loading pinion 85 with the rack 82a once more so as to drive the transporting plate 82 in the reverse direction, thereby returning the disk holding member 11 into the magazine 10.

As described above, according to the present invention, a 1-to-1 corresponding relation is constantly maintained between the rotation direction of the loading pinion 85 which is the output gear and the operating direction of the transporting plate 82 which is the disk holding member transporting means in both the disk loading operation and the disk ejecting operation, and is arranged so that only the operating direction of the chucking plate 83 switches alternately each time the loading gear 89 rotates a half-rotation, as to the loading pinion 85 rotating in the same direction.

In other words, according to the present embodiment, while the transporting plate 82 is caused to make one reciprocal movement to perform extracting/returning operation of the disk holding member 11, the chucking plate 83 can be driven on the going path or the returning path to perform chucking operation of chucking disengagement operation. Accordingly, as with the first embodiment, the transporting plate 82 is caused to carry out the same reciprocal movement at all times by means of a certain rotation control of causing the loading pinion 95 to rotate in the first direction by a certain amount and then in the second direction by a certain amount, and further, the chucking plate 83 can be caused to alternately perform chucking operation and chucking disengagement operation. Particularly, according to the present embodiment, an arrangement is employed wherein the swing gear 87 is made to alternately mesh with the linkage gear 88 on the transporting plate 82 driving side, and the loading gear 89 on the chucking plate 83 driving side, so the transfer of output to the transporting plate 82 and chucking plate 83 can be selectively switched between the two.

As described above, according to the present embodiment, a 1-to-1 corresponding relation can be constantly maintained between the rotation direction of the loading pinion 85 which is the output gear and the operating direction of the transporting plate 82 which is the disk holding member transporting means in both the disk loading operation and the disk ejecting operation. Accordingly, control is easy, and even in the event that the power is turned off the operation being performed before power outage can be resumed, thus facilitating securing of continuity of control.

Also, the transporting plate 82 is caused to carry out the same reciprocal movement at all times by means of a certain rotation control of causing the loading pinion 85 to rotate in the first direction by a certain amount and then in the second direction by a certain amount, and further, the chucking plate 83 is caused to alternately perform chucking operation and chucking disengagement operation, whereby disk loading operation and disk ejecting operation can be performed alternately. In other words, control is further simplified, since disk loading operation and disk ejecting operation can be alternately performed by means of the same rotation control of the loading pinion 85. This point is also the same as with the aforementioned FIG. 1.

Particularly, regarding the present embodiment, the construction of the gear mechanism 41 is simplified, and further, the surrounding construction has also been simplified. In other words, the disengagement and linking of the transporting plate 82 and the driving side is conducted by switching of the rotational position of the swing gear 87, so there is no need for members for performing moving or holding of the transporting plate 82 following disengagement by gulleting, as with the first embodiment which has provided the rack 43a of the transporting plate 43 with a gullet portion 43d, nor is there need for members for re-meshing with the driving side. Specifically, members used in the first embodiment such as the control plate 55 and transporting plate holder 57, or starter rack 61 and starter link 62, etc. are all unnecessary. Accordingly, the construction of the loading unit 40 can be further markedly reduced in size and complexity as compared to the aforementioned first embodiment, and thus the overall apparatus can be reduced in size and simplified.

Also, the swing gear 87 can be appropriately rotated at appropriate timing by means of the combination of the cam groove 82c of the transporting plate 82, the lock plate 90, and the spring 91, so that the transfer of output to the transporting plate 82 and chucking plate 83 can be switched in a sure manner at appropriate timing, and thus has excellent operational reliability. Further, according to the present embodiment, there is space provided between the fitting groove 83a of the chucking plate 83 and the driving pin 89a of the loading gear 89, so that the chucking plate 83 can be moved using part of the half-rotation of the loading gear 89, thereby giving leeway to the amount of rotation of the loading gear 89, and at the same time, driving the chucking plate 83 is a sure manner.

On the other hand, the assembly work is fundamentally simple for the device according to the present embodiment which is of a simple construction and has few parts. Further, with the present embodiment, space is provided between the fitting groove 83a of the chucking plate 83 and the driving pin 89a of the loading gear, so high precision is not required for the attachment position of the loading gear 89, making the assembly work easier in this aspect, as well. In other words, in the event that there is no space provided between the loading gear 89 and the driving pin 89a, high precision is required for the attachment position of the loading gear 89 in order to drive the chucking plate 83 accurately, but since with the present embodiment, space is provided at this place, so the chucking plate 83 can be driven accurately even if the attachment position of the loading gear 89 is off position, doing away with the need to attach the loading gear 89 with high precision.

The present invention is by no means restricted to the above embodiments, rather, a wide variety of alterations can be carried out within the scope of the invention. For example, in the above embodiments, the specific construction, positional relationship, and so forth, of the transporting plates 43 and 82, the chucking plates 44 and 83, the driving block 45 and the gear mechanism 81, and so forth, can be freely altered, and the fitting configuration between the transporting plates 43, 82 and the disk holding member 11 or the fitting configuration between the chucking plates 44, 83 and the driving unit 70 can be freely altered. Moreover, the present invention is by no means limited to a combination of the transporting plates 43 and 82, the chucking plates 44 and 83, the driving block 45 and the gear mechanism 81 of the above embodiment. Again, the magazine may be of a structure which is fixed to the device proper and cannot be detached. In other words, according to the present invention, the specific construction of the recording/replay means, chucking means, magazine, disk holding member transporting means, moving means, driving means and the selecting means thereof, and so forth, may be freely selected.

Also, the present invention is by no means limited to a disk changer device for a CD player, rather, the present invention can be applied in the same manner to various types of disk players, such as LD players, MD players, and so forth, exhibiting the same excellent advantages.

As described above, according to the present invention, a selecting mechanism for separately and selectively transferring the output of a single driving source to the disk holding member transporting means and chucking means is provided, thereby providing a disk changer device which is capable of maintaining continuity of control, small, and simple, by means of perpetually maintaining a 1-to-1 correspondence relation between the direction of rotation of the driving source and the direction of operation of the disk holding member.

What is claimed is:

1. A disk changer device comprising:
    a recording/replay head for performing at least one of recording on and playing back from a disk;
    a chucking device for chucking the disk to said recording/replay head;
    a disk holding member transporting plate for extracting disk holding members from a magazine in which a plurality of said disk holding members, each capable of holding a disk by insertion of said disk in a plate surface direction thereof, are stored in a stack so as to be extractable from and replaceable to said magazine, and transporting said disk holding members to a transporting position within the device;
    a moveable support structure for supporting said recording/replay head, said chucking device, and said disk holding member transporting plate, said moveable support structure allowing said recording/replay head, said chucking device and said disk holding member transporting plate to be moveable in the stacking direction of the disk holding members within said magazine; and
    a driving block for driving said disk holding member transporting plate and said chucking device to extract said disk holding member, while holding a disk, from said magazine, to chuck the disk held by said disk holding member to said recording/replay head, and to subsequently return said disk holding member, without any disk, to said magazine;
    wherein said driving block comprises:
        only one driving source; and
        a selecting mechanism for alternately and selectively transferring an output of said driving source to said disk holding member transporting plate and to said chucking device.

2. A disk changer device according to claim 1, wherein said driving block is constructed so as to rotate in a first direction, and said chucking device is constructed so as to continuously perform a chucking operation and a chucking disengaging operation, driven by the rotation in the first direction of said driving source.

3. A disk changer device according to claim 1, wherein said driving block is constructed so as to perform rotation in first and second directions, and said disk holding member transporting plate is constructed so as to extract said disk holding members from said magazine driven by the rotation of said driving source in the first direction, and to return said disk holding members to said magazine driven by the rotation of said driving source in the second direction.

4. A disk changer device according to claim 1, wherein said selecting mechanism comprises:
  an output gear which rotates in a direction corresponding with the rotation of said driving source;
  a transporting driving rack which is provided to said disk holding member transporting plate and is linked with said output gear so as to move said disk holding member transporting plate by the rotation of said output gear;
  a gullet portion which is provided to a linkage portion between said output gear and said transporting driving rack and which disengages the linkage between the output gear and transporting driving rack when the disk holding member transporting plate completes transporting of said disk holding member to said transporting position;
  a planetary gear which is linked with said output gear, and which is provided so as to rotate around the periphery of said output gear;
  a chucking driving gear which is capable of being linked with said planetary gear according to the rotational position of said planetary gear, and which drives said chucking device by means of the rotation of said planetary gear when linked with the planetary gear; and
  a cam which is capable of movement according to the position of said disk holding member transporting plate, and which restricts the rotation of said planetary gear while said disk holding member transporting plate transports said disk holding member to said transporting position, and which allows rotation of said planetary gear in the direction of linkage with said chucking driving gear in the event that said disk holding member transporting plate completes transporting of said disk holding member to said transporting position.

5. A disk changer device according to claim 4, wherein said output gear is constructed so as to directly mesh with said transporting driving rack and also to directly mesh with said planetary gear, and wherein said planetary gear is provided so as to rotate around the periphery of said output gear.

6. A disk changer device according to claim 1, wherein said selecting mechanism comprises:
  an output gear which rotates in a direction corresponding with the rotation of said driving source;
  a planetary gear which is linked with said output gear, and which is provided so as to rotate around the periphery of said output gear between first and second rotating positions;
  a transporting driving rack which is provided to said disk holding member transporting plate and is linked with said planetary gear when said to planetary gear is at said first rotational position so as to move said disk holding member transporting plate with rotation of said planetary gear;
  a chucking driving gear which is capable of being linked with said planetary gear in the event that said planetary gear is at said second rotational position, and which drives said chucking device by means of the rotation of said planetary gear when linked with the planetary gear; and
  a cam which is capable of movement according to the position of said disk holding member transporting plate, and which retains said planetary gear at said first rotational position while said disk holding member transporting plate transports said disk holding member to said transporting position, and which allows rotation of said planetary gear to said second rotational position in the event that said disk holding member transporting plate completes transporting of said disk holding member to said transporting position.

7. A disk changer device according to claim 6, wherein said planetary gear is provided so as to directly mesh with said output gear and is provided to rotate around the periphery of said output gear.

8. A disk changer device according to claim 6, wherein a locking member is provided between said cam and said planetary gear, said locking member being rotatably configured between a locking position which locks said planetary gear at said first rotational position, and a disengaging position which disengages the lock on the planetary gear allows rotation of the planetary gear to said second rotational position, the motion of said locking mechanism being synchronous with said cam.

9. A disk changer device according to claim 1, wherein said magazine is detachably provided to said disk changer device.

10. A disk changer device comprising:
  recording/replay head for performing at least one of recording on and playing back from a disk;
  chucking device for chucking the disk to said recording/replay head;
  a disk holding member transporting plate for extracting disk holding members from a magazine in which a plurality of said disk holding members, each capable of holding disks by insertion of said disks in a plate surface direction thereof, are stored in a stock so as to be extractable from and replaceable to said magazine, and transporting said disk holding members to a transporting position within the device;
  a movable member for supporting said recording/replay head, said chucking device, and said disk holding member transporting plate, said movable support structure allowing said recording/replay head, said chucking device and said disk holding member transporting plate to be movable in the stacking direction of the disk holding members within said magazine; and
  a driving block, constructed so as to rotate in a first direction, for driving said disk holding member transporting plate and said chucking device to extract said disk holding member, while holding a disk, from said magazine, to chuck the disk held by said disk holding member to said recording/replay head, and to subsequently return said disk holding member, without any disk, to said magazine;
  wherein said driving block comprises:
    only one driving source; and
    a selecting mechanism for alternately and selectively transferring an output of said driving source to said disk holding member transporting plate and to said chucking device;
    said chucking device being constructed so as to continuously perform a chucking operation and a chucking disengaging operation according to the rotation in the first direction of said driving block when the chucking device is selected by the selecting mechanism.

11. A disk changer device according to claim 10, wherein said driving block is constructed so as to perform rotation in first and second directions, and said disk holding member transporting plate is constructed so as to extract said disk holding members from said magazine driven by the rotation of said driving source in the first direction, and to return said disk holding members to said magazine driven by the rotation of said driving source in the second direction.

12. A disk changer device according to claim 11, wherein said selecting mechanism comprises:
   an output gear which rotates in a direction corresponding with the rotation of said driving source;
   a planetary gear which is linked with said output gear, and which is provided so as to rotate around the periphery of said output gear between first and second rotating positions;
   a transporting driving rack which is provided to said disk holding member transporting plate and is linked with said planetary gear when said to planetary gear is at said first rotational position so as to move said disk holding member transporting plate with rotation of said planetary gear;
   a chucking driving gear which is capable of being linked with said planetary gear in the event that said planetary gear is at said second rotational position, and which drives said chucking device by means of the rotation of said planetary gear when linked with the planetary gear; and
   a cam which is capable of movement according to the position of said disk holding member transporting plate, and which retains said planetary gear at said first rotational position while said disk holding member transporting plate transports said disk holding member to said transporting position, and which allows rotation of said planetary gear to said second rotational position in the event that said disk holding member transporting plate completes transporting of said disk holding member to said transporting position.

13. A disk changer device according to claim 12, wherein said planetary gear is provided so as to directly mesh with said output gear and is provided to rotate around the periphery of said output gear.

14. A disk changer device according to claim 13, wherein a locking member is provided between said cam and said planetary gear, said locking member being rotatably configured between a locking position which locks said planetary gear at said first rotational position, and a disengaging position which disengages the lock on the planetary gear allows rotation of the planetary gear to said second rotational position, the motion of said locking mechanism being synchronous with said cam.

15. A disk changer device according to claim 14, wherein said magazine is detachably provided to said disk changer device.

16. A disk changer device according to claim 10, wherein said selecting mechanism comprises:
   an output gear which rotates in a direction corresponding with the rotation of said driving source;
   a transporting driving rack which is provided to said disk holding member transporting plate and is linked with said output gear so as to move said disk holding member transporting plate by the rotation of said output gear;
   a gullet portion which is provided to a linkage portion between said output gear and said transporting driving rack and which disengages the linkage between the output gear and transporting driving rack when the disk holding member transporting plate completes transporting of said disk holding member to said transporting position;
   a planetary gear which is linked with said output gear, and which is provided so as to rotate around the periphery of said output gear;
   a chucking driving gear which is capable of being linked with said planetary gear according to the rotational position of said planetary gear, and which drives said chucking device by means of the rotation of said planetary gear when linked with the planetary gear; and
   a cam which is capable of movement according to the position of said disk holding member transporting plate, and which restricts the rotation of said planetary gear while said disk holding member transporting plate transports said disk holding member to said transporting position, and which allows rotation of said planetary gear in the direction of linkage with said chucking driving gear in the event that said disk holding member transporting plate completes transporting of said disk holding member to said transporting position.

17. A disk changer device according to claim 16, wherein said output gear is constructed so as to directly mesh with said transporting driving rack and also to directly mesh with said planetary gear, and wherein said planetary gear is provided so as to rotate around the periphery of said output gear.

18. A disk changer device according to claim 10, wherein said selecting mechanism comprises:
   an output gear which rotates in a direction corresponding with the rotation of said driving source;
   a planetary gear which is linked with said output gear, and which is provided so as to rotate around the periphery of said output gear between first and second rotating positions;
   a transporting driving rack which is provided to said disk holding member transporting plate and is linked with said planetary gear when said to planetary gear is at said first rotational position so as to move said disk holding member transporting plate with rotation of said planetary gear;
   a chucking driving gear which is capable of being linked with said planetary gear in the event that said planetary gear is at said second rotational position, and which drives said chucking device by means of the rotation of said planetary gear when linked with the planetary gear; and
   a cam which is capable of movement according to the position of said disk holding member transporting plate, and which retains said planetary gear at said first rotational position while said disk holding member transporting plate transports said disk holding member to said transporting position, and which allows rotation of said planetary gear to said second rotational position in the event that said disk holding member transporting plate completes transporting of said disk holding member to said transporting position.

19. A disk changer device according to claim 18, wherein said planetary gear is provided so as to directly mesh with said output gear and is provided to rotate around the periphery of said output gear.

20. A disk changer device according to claim 18, wherein a locking member is provided between said cam and said planetary gear, said locking member being rotatably configured between a locking position which locks said planetary gear at said first rotational position, and a disengaging position which disengages the lock on the planetary gear allows rotation of the planetary gear to said second rotational position, the motion of said locking mechanism being synchronous with said cam.

21. A disk changer device according to claim 10, wherein said magazine is detachably provided to said disk changer device.

22. A disk changer device comprising:

recording/replay head for performing at least one of recording on and playing back from a disk;

chucking device for chucking the disk to said recording/replay head;

a disk holding member transporting plate for extracting disk holding members from a magazine, detachably provided to said disk changer device, in which a plurality of said disk holding members, each capable of holding disks by insertion of said disks in a plate surface direction thereof, are stored in a stock so as to be extractable from and replaceable to said magazine, and transporting said disk holding members to a transporting position within the device;

a movable member for supporting said recording/replay head, said chucking device, and said disk holding member transporting plate, said movable support structure allowing said recording/replay head, said chucking device and said disk holding member transporting plate to be movable in the stacking direction of the disk holding members within said magazine; and a driving block constructed so as to perform rotation in first and second directions, for driving said disk holding member transporting plate constructed so as to extract said disk holding members from said magazine driven by the rotation of said driving source in the first direction, and to return said disk holding members to said magazine driven by the rotation of said driving source in the second direction;

wherein said driving block comprises:

only one driving source; and a selecting mechanism for alternately and selectively transferring an output of said driving source to said disk holding member transporting plate and to said chucking device;

said chucking device being constructed so as to continuously perform a chucking operation and a chucking disengaging operation according to the rotation in the first direction of said driving block when the chucking device is selected by the selecting mechanism;

said selecting mechanism including an output gear which rotates in a direction corresponding with the rotation of said driving block;

a transporting driving rack which is provided to said disk holding member transporting plate and is linked with said output gear so as to move said disk holding member transporting plate by the rotation of said output gear;

a gullet portion which is provided to a linkage portion between said output gear and said transporting driving rack and which disengages the linkage between the output gear and transporting driving rack when the disk holding member transporting plate completes transporting of said holding member to said transporting position;

a planetary gear which is linked with said output gear, and which is provided so as to rotate around the periphery of said output gear;

a chucking driving gear which is capable of being linked with said planetary gear according to the rotational position of said planetary gear, and which drives said chucking device by means of the rotation of said planetary gear when linked with the planetary gear; and a cam which is capable of movement according to the position of said disk holding member transporting plate, and which restricts the rotation of said planetary gear while said disk holding member transporting plate transports said disk holding member to said transporting position, and which allows rotation of said planetary gear in the direction of linkage with said chucking driving gear in the event that said disk holding member transporting plate completes transporting of said disk holding member to said transporting position.

\* \* \* \* \*